(12) United States Patent
Shih et al.

(10) Patent No.: US 9,568,773 B2
(45) Date of Patent: Feb. 14, 2017

(54) PIXEL STRUCTURE AND PIXEL ARRAY HAVING THE SAME

(71) Applicant: Au Optronics Corporation, Hsinchu (TW)

(72) Inventors: Chih-Chang Shih, Hsinchu County (TW); Shin-mei Gong, Taoyuan (TW); Shu-En Li, Tainan (TW); Kun-Cheng Tien, New Taipei (TW); Chien-Huang Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/870,011

(22) Filed: Sep. 30, 2015

(65) Prior Publication Data

US 2016/0342038 A1 Nov. 24, 2016

(30) Foreign Application Priority Data

May 22, 2015 (TW) .............................. 104116524 A

(51) Int. Cl.
*G02F 1/1343* (2006.01)
*G02F 1/1337* (2006.01)
*G02F 1/1368* (2006.01)
*G02F 1/1362* (2006.01)

(52) U.S. Cl.
CPC ....... *G02F 1/133707* (2013.01); *G02F 1/1368* (2013.01); *G02F 1/13624* (2013.01); *G02F 1/134309* (2013.01); *G02F 1/136286* (2013.01); *G02F 2001/134345* (2013.01)

(58) Field of Classification Search
None
See application file for complete search history.

(56) References Cited

U.S. PATENT DOCUMENTS

| 2008/0049052 A1* | 2/2008 | Akiyama .......... G02F 1/134309 345/694 |
|---|---|---|
| 2010/0053528 A1 | 3/2010 | Li et al. |
| 2011/0242443 A1 | 10/2011 | Choi et al. |
| 2013/0063686 A1 | 3/2013 | Tashiro et al. |
| 2013/0194536 A1 | 8/2013 | Tae et al. |

(Continued)

FOREIGN PATENT DOCUMENTS

| CN | 102213872 | 10/2011 |
|---|---|---|
| CN | 102778791 | 11/2012 |

(Continued)

*Primary Examiner* — Fei Fei Yeung Lopez
(74) *Attorney, Agent, or Firm* — Jianq Chyun IP Office

(57) ABSTRACT

A pixel structure is provided. The pixel structure includes a control device, a main pixel electrode, and a sub pixel electrode. The main pixel electrode is electrically connected to the control device, and the main pixel electrode has a plurality of main pixel slits where the width thereof is S. The sub pixel electrode is electrically connected to the control device, and the sub pixel electrode has a first electrode pattern and a second electrode pattern. The first electrode pattern has a plurality of first slits where the width S1 thereof is equal to or greater than the width S of the main pixel slits. The second electrode pattern has no slits or has a plurality of second slits where the width S2 thereof is less than the width S of the main pixel slits. A pixel array including the pixel structure is also provided.

21 Claims, 22 Drawing Sheets

(56) References Cited

U.S. PATENT DOCUMENTS

2013/0293822 A1 11/2013 Chung et al.
2014/0204326 A1 7/2014 Wu et al.
2014/0253853 A1* 9/2014 Yoshida ............ G02F 1/133753
                                                        349/123

FOREIGN PATENT DOCUMENTS

| | | |
|---|---|---|
| CN | 103226271 | 7/2013 |
| CN | 103376601 | 10/2013 |
| CN | 103529603 | 1/2014 |
| TW | 201430466 | 8/2014 |
| TW | I472860 | 2/2015 |
| WO | PCT/JP2012/076277 | * 4/2013 |

* cited by examiner

PIXEL STRUCTURE AND PIXEL ARRAY HAVING THE SAME

CROSS-REFERENCE TO RELATED APPLICATION

This application claims the priority benefit of Taiwan application serial no. 104116524, filed on May 22, 2015. The entirety of the above-mentioned patent application is hereby incorporated by reference herein and made a part of this specification.

BACKGROUND OF THE INVENTION

Field of the Invention

The invention relaters to a pixel structure and a pixel array having the same.

Description of Related Art

As the LCD technology continuously progresses in a direction of providing a bigger display screen, the wide viewing techniques are being developed to improve the limited viewing angle inherent in a large-size display device. At the current stage, a commonly used wide viewing angle technique is a multi-domain vertical alignment (MVA) LCD panel.

In the LCD panel, an alignment pattern is designed to divide liquid crystal molecules of a same pixel region into a plurality of different alignment domains to achieve a wide viewing angle display effect, i.e., the MVA LCD panel. Limited by optical characteristics of the liquid crystal molecules, such type of the LCD panel may have a color shift phenomenon or inadequate color saturation under different viewing angles. In order to mitigate such phenomenon, based on amelioration of a driving technique and a pixel design, a technique of forming display regions with different brightness in a single pixel region, and forming a plurality of alignment regions in each of the display regions with different brightness is provided.

Although the aforementioned methods for resolving the color shift phenomenon or inadequate color saturation can mitigate a problem of white-bias (color washout) in case of a large viewing angle (side view), a side view image as compared to a front view image still has problems of blue-bias, green-bias or red-bias under different viewing angles. For example, when these techniques are employed, the following situations are still met: a side-view image as compared to a front-view image goes bluish at a low gray level, goes greenish or yellowish at a mid gray level, and goes yellowish at a high gray level. Namely, a problem of color shift in a side view occurs, and this causes the side-view image of the display panel to look unnatural.

SUMMARY OF THE INVENTION

The invention is directed to a pixel structure, which is capable of mitigating a problem of color shift in a side view image of the conventional pixel structures. The invention is further directed to a pixel array composed of the above pixels.

An exemplary embodiment of the invention provides a pixel structure, which includes a control device, a main pixel electrode, and a sub-pixel electrode. The main pixel electrode is electrically connected to the control device, and the main pixel electrode has a plurality of main pixel slits, where a width of the main pixel slits is S. The sub-pixel electrode is electrically connected to the control device and is separated from the main pixel electrode, where the sub-pixel electrode has a first electrode pattern and a second electrode pattern. The first electrode pattern has a plurality of first slits, where a width S1 of each of the first slits is equal to or greater than the width S of the main pixel slits. The second electrode pattern has no slits or has a plurality of second slits, where a width S2 of each of the second slits is less than the width S of the main pixel slits.

An exemplary embodiment of the invention provides a pixel array, which includes a first pixel structure and a second pixel structure. The first pixel structure includes a first control device, a first main pixel electrode, and a first sub-pixel electrode; and the second pixel structure includes a second control device, a second main pixel electrode, and a second sub-pixel electrode. The first main pixel electrode is electrically connected to the first control device, and the first main pixel electrode has a plurality of first main pixel slits, where a width of each of the first main pixel slits is S. The first sub-pixel electrode is electrically connected to the first control device and is separated from the first main pixel electrode, where the first sub-pixel electrode has a first electrode pattern and a second electrode pattern. The first electrode pattern has a plurality of first slits, where a width S1 of each of the first slits is equal to or greater than the width S of the first main pixel slits. The second electrode pattern has no slits or has a plurality of second slits, where a width S2 of each of the second slits is less than the width S of the first main pixel slits. The second main pixel electrode is electrically connected to the second control device, which the second main pixel electrode has a plurality of second main pixel slits, where a width of each of the second main pixel slits is D1. Each of the width D1 of the second main pixel slits is equal to the width S of the first main pixel slits. The second sub-pixel electrode is electrically connected to the second control device and is separated from the second main pixel electrode, where the second sub-pixel electrode has a plurality of second sub-pixel slits, and a width of each of the second sub-pixel slits is D2. The width D2 of the second sub-pixel slits is equal to the width D1 of the second main pixel slits.

According to the exemplary embodiments of the invention, by adjusting the spacing of the slits of the first and second electrode patterns located in the sub-pixel electrode of the pixel structure, the slits of the first electrode pattern and the slits of the second electrode pattern in the sub-pixel electrode have different widths. Namely, in the exemplary embodiments of the invention, the phenomenon of yellow-bias at a high gray level can be suppressed by adjusting the area of the first electrode pattern (e.g., S1>S), and the phenomenon of yellow-bias or green-bias at a middle gray level can be suppressed by adjusting the area of the second electrode pattern (e.g., S2<S). In view of the above-mentioned pixel designs, the phenomenon of yellow-bias and/or green-bias at a middle gray level and the phenomenon of yellow-bias at a high gray level can be suppressed, thereby mitigating the problem of color shift in a side view image of the pixel structures.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
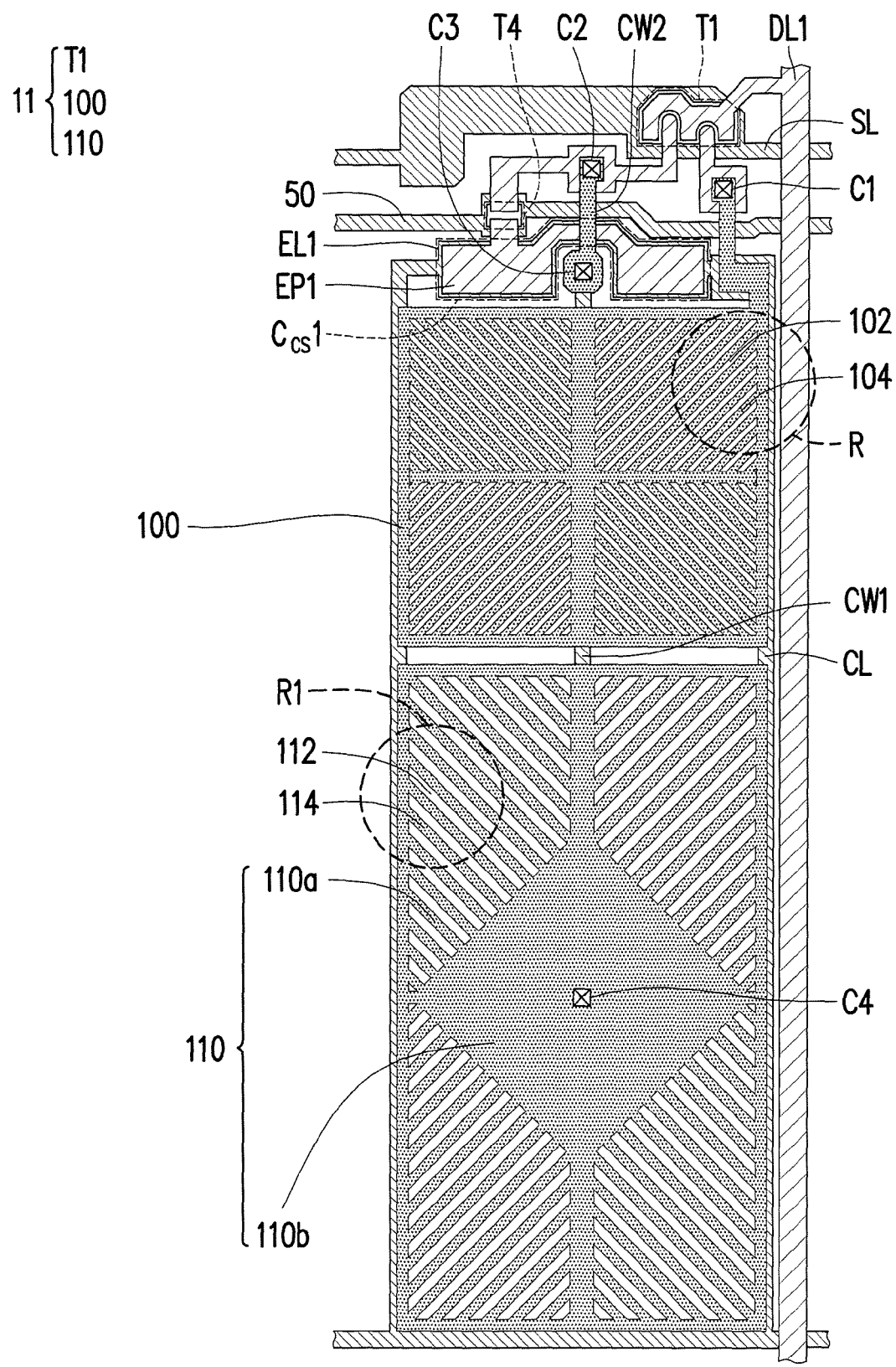
FIG. 1A is a schematic top view illustrating a pixel structure according to an embodiment of the invention.

FIG. 1A is a schematic top view illustrating a pixel structure according to an embodiment of the invention. A pixel structure 11 of the present embodiment includes a control device T1, a main pixel electrode 100, and a sub-pixel electrode 110. Referring to FIG. 1A, the pixel structure 11 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4.

Extension directions of the scan line SL and the signal line 50 are different from an extension direction of the data line DL1. It is preferred that the extension directions of the scan line SL and the signal line 50 are perpendicular to the extension direction of the data line DL1. The scan line SL and the signal line 50 are, for example, located in the same layer or different layers, and the scan line SL and the signal line 50 are electrically isolated from one another and are not overlapping with each other. In addition, the scan line SL and the data line DL1 are located in different layers, and sandwich an insulating layer (not illustrated) therebetween; and the signal line 50 and the data line DL1 are located in different layers, and sandwich an insulating layer (not illustrated) therebetween. The scan line SL and the data line DL1 are mainly configured to transmit a driving signal for driving the pixel structure 11. In view of conductivity, the scan line SL, the signal line 50 and the data line DL1 are generally made of metal materials. However, the invention is not limited thereto. According to other embodiments, the scan line SL, the signal line 50 and the data line DL1 may also be made of other conductive materials, such as alloys, metal oxides, metal nitrides, metal oxynitrides or stacked layers of metal materials and other conductive materials.

The control device T1 is electrically connected to the scan line SL and the data line DL1. Here, the control device T1 is, for example, a thin film transistor (TFT). In the present embodiment, the control device T1 of a bottom-gate thin film transistor is provided as an example. However, the invention is not limited thereto. In other embodiments, the control device T1 may be a top-gate thin film transistor.

The sharing switch device T4 is, for example, a TFT. The sharing switch device T4 is electrically connected to the signal line 50 and is further electrically to the control device T1. In the present embodiment, the sharing switch device T4 of a bottom-gate thin film transistor is provided as an example. However, the invention is not limited thereto. In other embodiments, the sharing switch device T4 may be a top-gate thin film transistor.

Referring to FIG. 1A, the sharing capacitor $C_{cs}1$ is composed of the lower electrode EL1 and the upper electrode EP1. The lower electrode EL1, the scan line SL and the signal line 50 are, for example, located in the same layer. The upper electrode EP1 is disposed above the lower electrode EL 1 and is electrically connected to the sharing switch device T4, where the upper electrode EP1 and the data line DL1 are located in the same layer. The common line CL and the wiring CW1 are located under the main pixel electrode 100 and the sub-pixel electrode 110, and are, for example, located in the same layer with the scan line SL, the signal line 50, and the lower electrode EL1. Here, the common line CL is coupled to the main pixel electrode 100 and the sub-pixel electrode 110 to form a storage capacitor (not marked). The control device T1 is electrically connected to the sub-pixel electrode 110 through the wirings CW1~CW2 and the contact windows C2~C4. In the present embodiment, the wiring CW2 is, for example, located in the same layer with the main pixel electrode 100 and the sub-pixel electrode 110.

As shown in FIG. 1A, the pixel structure 11 includes the main pixel electrode 100 and the sub-pixel electrode 110, which the main pixel electrode 100 is electrically connected to a drain of the control device T1 through the contact window C1. The sub-pixel electrode 110 is electrically connected to the drain of the control device T1 through the wirings CW1~CW2 and the contact windows C2~C4.

As the above, when the control device T1 is turned on as being driven by the scan line SL and the data line DL1, a driving voltage is transmitted to the main pixel electrode 100 and the sub-pixel electrode 110 through the control device T1. By this, the sharing switch device T4 and the sharing capacitor $C_{cs}1$ are turned on through the control of the signal line 50, such that the voltages of the main pixel electrode 100 and the sub-pixel electrode 110 are different. Accordingly, based on such connection relationship of the control device T1, the sharing switch device T4, and the sharing capacitor Ccs1, the main pixel electrode 100 and the sub-pixel electrode 110 have different driving voltages.

Figure 1B:
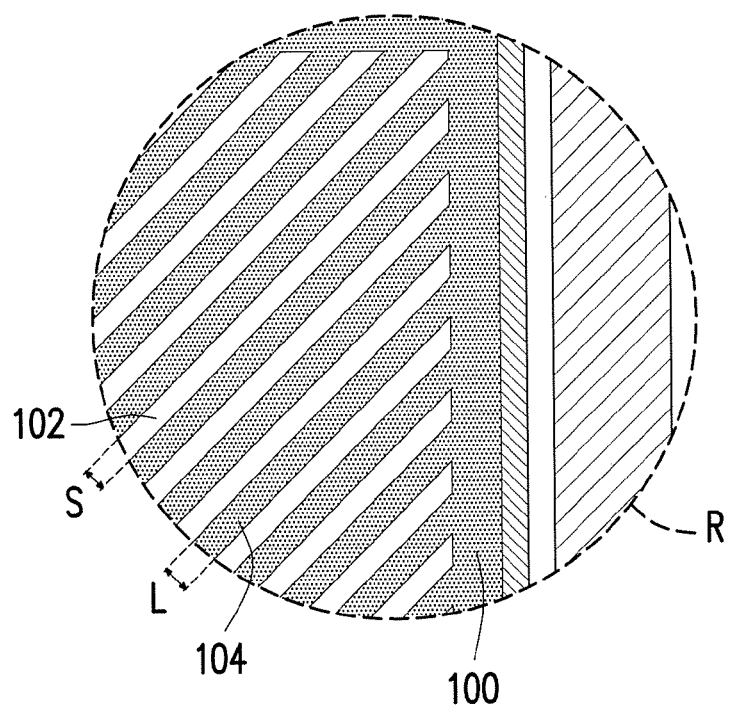
FIGS. 1B-1C are schematic partial views illustrating the pixel structure depicted in FIG. 1A.
Figure 1C:
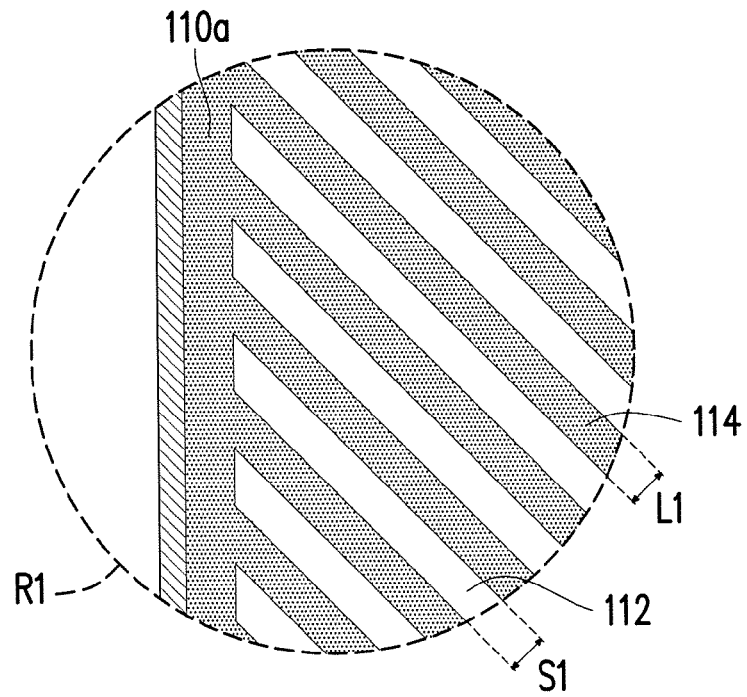

FIGS. 1B-1C are schematic partial views illustrating the pixel structure depicted in FIG. 1A, in which FIG. 1B and FIG. 1C respectively illustrates the R region and the R1 region in FIG. 1A, and the R region in FIG. 1B is a partial enlarged view of the main pixel electrode 100 and the R1 region in FIG. 1C is a partial enlarge view of the sub-pixel electrode 110. Referring FIG. 1A to FIG. 1C together, the main pixel electrode 100 has a plurality of main pixel strip electrodes 104 and a plurality of main pixel slits 102, which a line width of the main pixel strip electrodes 104 is L, and a width of the main pixel slits 102 is S (as shown in FIG. 1B). The sub-pixel electrode 110 has the first electrode pattern 110a and the second electrode pattern 110b. In the present embodiment, the first electrode pattern 110a has a plurality of first strip electrodes 114 and a plurality of first slits 112, which a line width of the first strip electrode 114 is L1, a width of the first slits 112 is S1 (as shown in FIG. 1C), and each of the width S1 of the first slits 112 is greater than the width S of the main pixel slits 102; and the second electrode pattern 110b has no slits. However, the invention is not limited thereto. In other embodiments, the width S1 of the first slits 112 is, for example, equal to the width S of the main pixel slits 102, and the second electrode pattern 110b, for example, has no slits. The first electrode pattern 110a is connected to the second electrode pattern 110b, and the first electrode pattern 110a and the second electrode pattern 110b share the same driving voltage. The main pixel electrode 100 has a main line width/slit width ratio (L/S), the first electrode pattern 110a of the sub-pixel electrode 110 has a first line width/slit width ratio (L1/S1), and the main line width/slit width ratio (L/S) of the main pixel electrode 100 is greater than the first line width/slit width ratio (L1/S1) of the first electrode pattern 110a. In one embodiment, the main line width L of the main pixel electrode 100 is equal to the first line width L1 of the first electrode pattern 110a. In the present embodiment, the main line width/slit width ratio (L/S) of the main pixel electrode 100 is, for example, (4/2), and the first line width/slit width ratio (L1/S1) of the first electrode pattern 110a is, for example, (4/4). However, the invention is not limited thereto. An area of the second electrode pattern 110b is about 5% to 80% of an area of the sub-pixel electrode 110. Furthermore, a shape of the second electrode pattern 110b may be, for example, quadrangle, hexagonal, and polygonal.

Besides, in the present embodiment, the second electrode pattern 110b is located at the center of the sub-pixel electrode 110, and the first electrode pattern 110a is located on two opposite sides of the second electrode pattern 110b. Further, according to the present embodiment, the second electrode pattern 110b is a quadrangle as shown in FIG. 1A, in which an included angle is defined between each side of the second electrode pattern 110b of the quadrangle and an extending direction of the scan line SL, where the included angle is about 45° to 60°. In addition, an included angle is defined between at least one side of the second electrode pattern 110b of the quadrangle and an extending direction of a part of the first slits 112 connected to the second electrode pattern 110b, where the included angle is about 80° to 100°.

Figure 2:
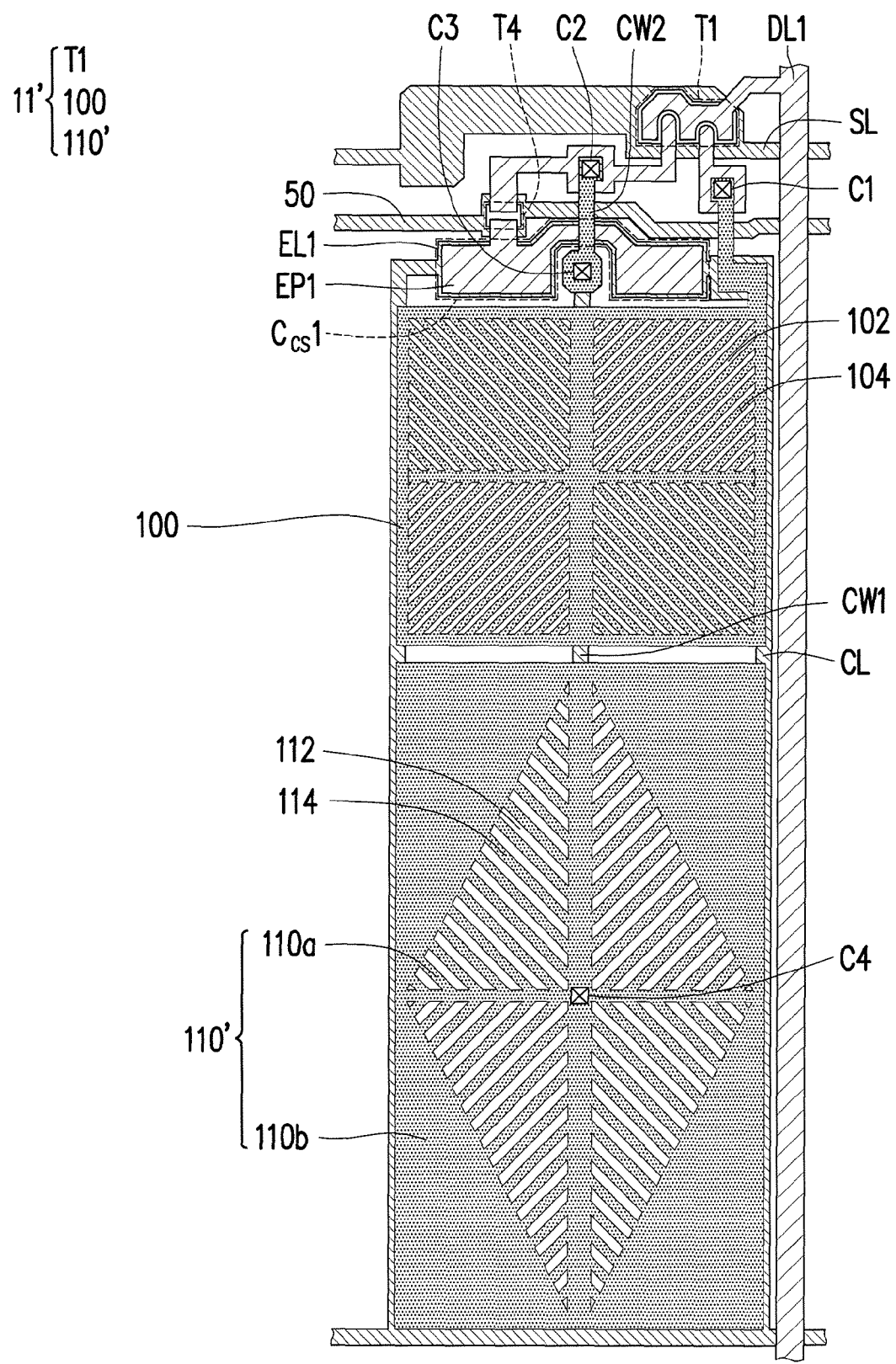
FIG. 2 is a schematic top view illustrating a pixel structure according to another embodiment of the invention.

FIG. 2 is a schematic top view illustrating a pixel structure according to another embodiment of the invention. Referring to FIG. 1A and FIG. 2 together, the pixel structure 11' depicted in FIG. 2 and the pixel structure 11 depicted in FIG. 1A is similar, the difference is that, for the pixel structure 11' depicted in FIG. 2, the first electrode pattern 110a is located at the center of the sub-pixel electrode 110, and the second electrode pattern 110b is located on two opposite sides of the first electrode pattern 110a.

The main pixel electrode 100 and the sub-pixel electrode 110 may be, for example, a transparent pixel electrode, a reflective pixel electrode or a transflective pixel electrode. The transparent pixel electrode comprises a metal oxide, such as indium tin oxide (ITO), indium zinc oxide (IZO), aluminum tin oxide (ATO), aluminum zinc oxide (AZO), indium-gallium-zinc oxide (IGZO) or any other suitable metal oxide material, or at least two of materials above stacked to each other. The reflective pixel electrode comprises a metal material having high reflectivity.

As described above, compared to the design of a conventional pixel structure, the design having the width S1 of the first slits 112 of the sub-pixel electrode 110 being greater than the width S of the main pixel slits 102 is employed in the pixel structure 11 of the present embodiment to weaken an electrical field of the first electrode pattern 110a, such that the first electrode pattern 110a of the sub-pixel electrode 110 has a larger threshold voltage, and thus the first electrode pattern 110a of the sub-pixel electrode 110 can be turned on later, thereby suppressing the phenomenon of yellow-bias at a high gray level. At the same time, by employing the design of the second electrode pattern 110b of the sub-pixel electrode 110 having no slits, an electrical field of the second electrode pattern 110b becomes strong, such that the second electrode pattern 110b of the sub-pixel electrode 110 has a smaller threshold voltage, and thus the second electrode pattern 110b of the sub-pixel electrode 110 can be turned on earlier, thereby suppressing the phenomenon of yellow-bias and/or green-bias at a middle gray level. Therefore, the pixel structure of the present embodiment is capable of mitigating the problem of color shift in a side view image, as compared to the conventional pixel structure. Besides, since the second electrode pattern 110b of the sub-pixel electrode 110, for example, has a diamond shape which is located at the center of the sub-pixel electrode 110, in that way, the pixel structure 11 of the present embodiment has the advantage of liquid crystal tilt.

Figure 3A:
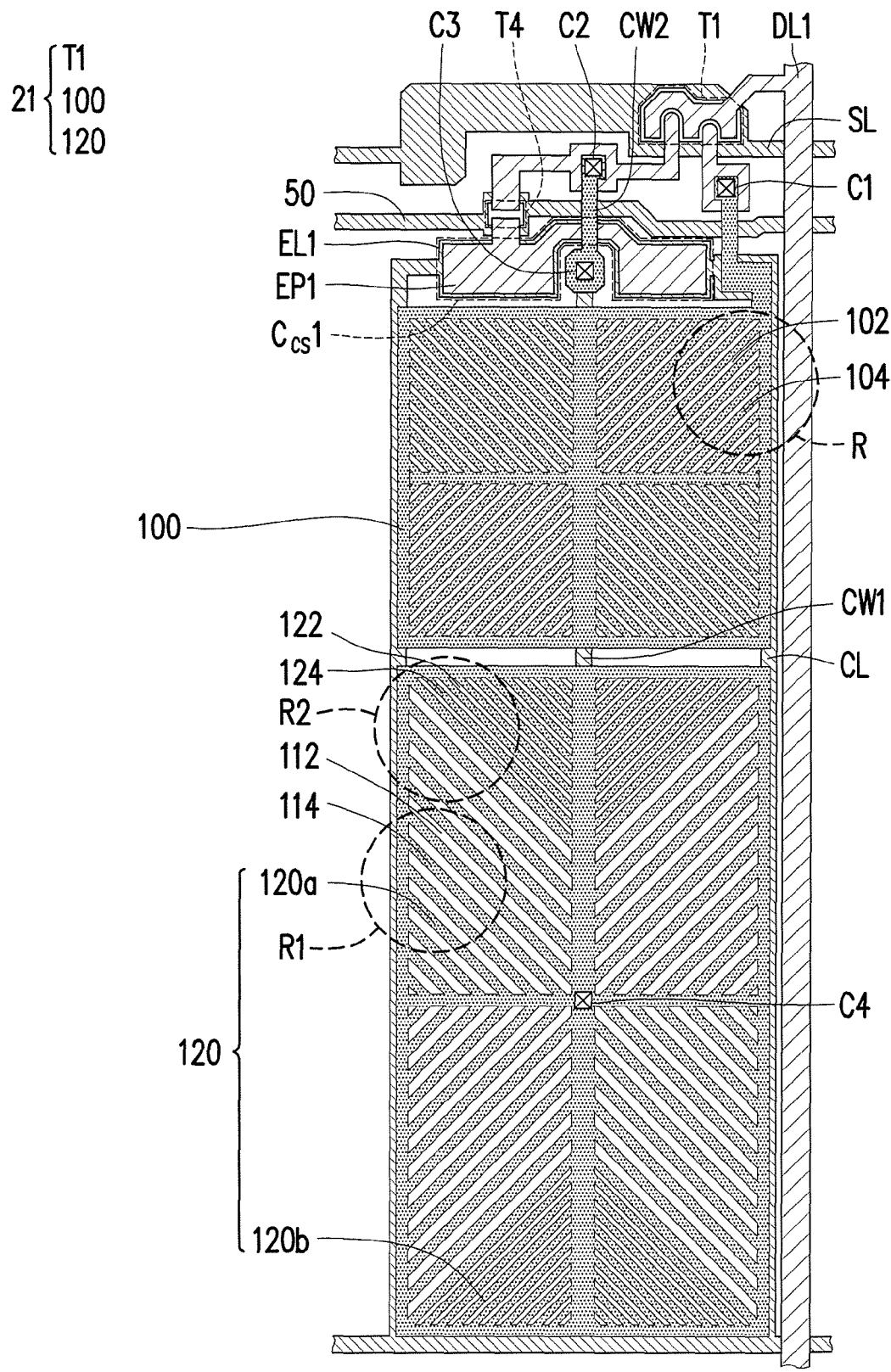
FIG. 3A is a schematic top view illustrating a pixel structure according to an embodiment of the invention.

FIG. 3A is a schematic top view illustrating a pixel structure according to an embodiment of the invention. Referring to FIG. 3A, a pixel structure 21 of the present embodiment includes a control device T1, a main pixel electrode 100, and a sub-pixel electrode 120. The pixel structure 21 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4. The pixel structure 21 of the present embodiment is similar to the pixel structure 11 of FIG. 1A, so that the same or similar devices are represented by the same or similar symbols, and details thereof are no repeated. A difference between the pixel structure 21 and the pixel structure 11 is that, the pixel structure 21 is replacing the sub-pixel electrode 110 with the sub-pixel electrode 120.

As shown in FIG. 3A, the pixel structure 21 includes the main pixel electrode 100 and the sub-pixel electrode 120. Here, the common line CL is coupled to the main pixel electrode 100 and the sub-pixel electrode 120 to foam a storage capacitor (not marked). The control device T1 is electrically connected to the main pixel electrode 100 through the contact window C1. The control device T1 is electrically connected to the sub-pixel electrode 120 through the wirings CW1~CW2 and the contact windows C2~C4. The main pixel electrode 100 and the sub-pixel electrode 120 have different driving voltages.

Figure 3B:
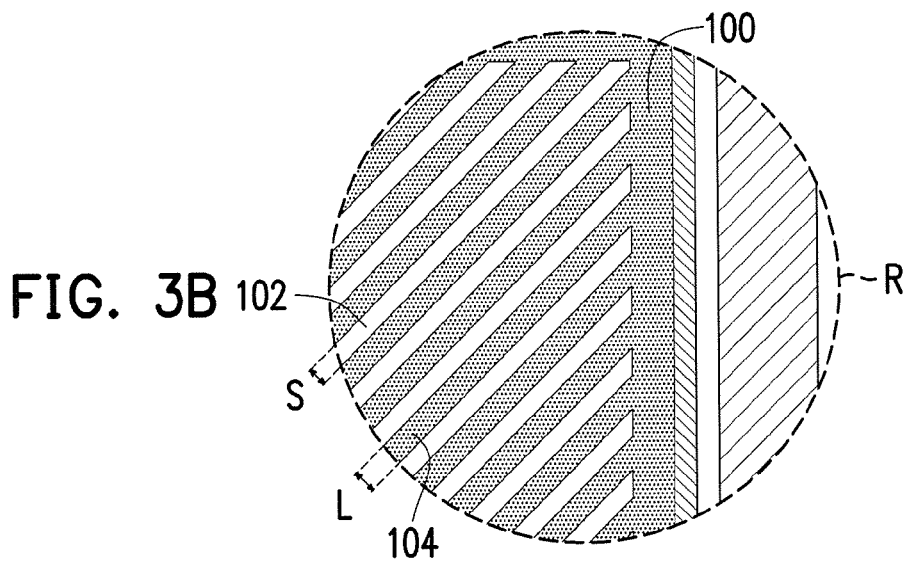
FIGS. 3B-3D are schematic partial views illustrating the pixel structure depicted in FIG. 3A.
Figure 3C:
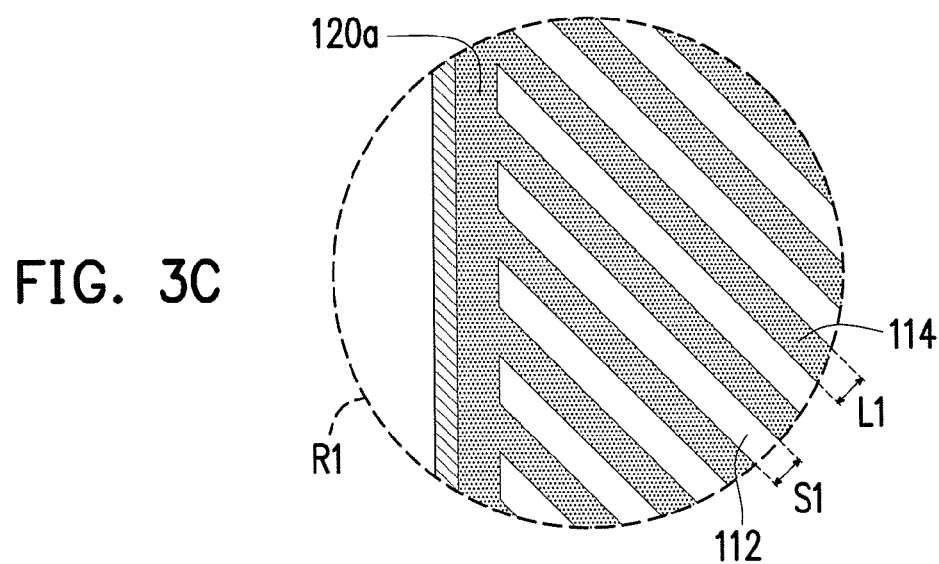
Figure 3D:
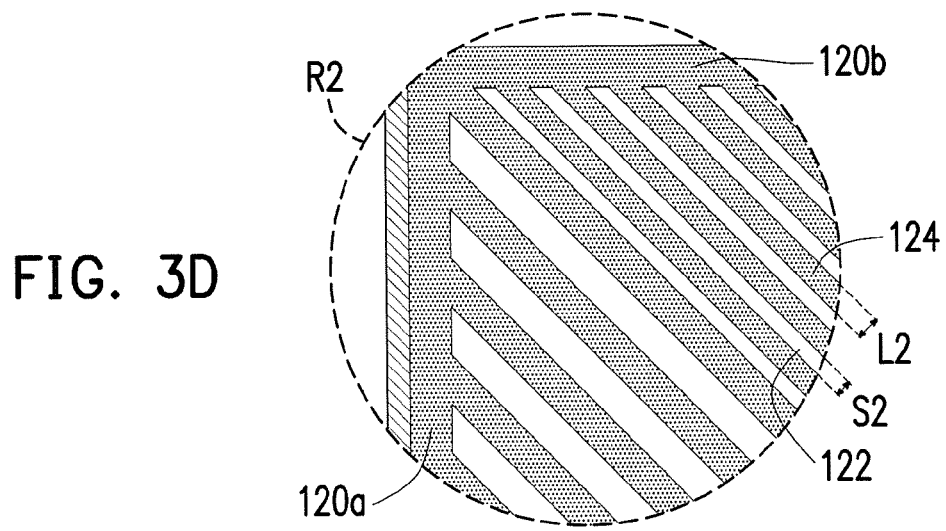

FIGS. 3B-3D are schematic partial views illustrating the pixel structure depicted in FIG. 3A, in which FIG. 3B-3D respectively illustrates the R region, the R1 region and the R2 region in FIG. 3A, where the R region in FIG. 3B is a partial enlarged view of the main pixel electrode 100, the R1 region in FIG. 3C is a partial enlarge view of the first electrode pattern 120a of the sub-pixel electrode 120, and the R2 region in FIG. 3D is a partial enlarge view of the second electrode pattern 120b of the sub-pixel electrode 120. Referring FIG. 3A to FIG. 3D together, the main pixel electrode 100 has a plurality of main pixel strip electrodes 104 and a plurality of main pixel slits 102, which a line width of the main pixel strip electrodes 104 is L, and a width of the main pixel slits 102 is S (as shown in FIG. 3B). The sub-pixel electrode 120 has the first electrode pattern 120a and the second electrode pattern 120b. In the present embodiment, the first electrode pattern 120a has a plurality of first strip electrodes 114 and a plurality of first slits 112, which a line width of the first strip electrode 114 is L1 and a width of the first slits is S1 (as shown in FIG. 3C), where each of the width S1 of the first slits 112 is greater than the width S of the main pixel slits 102; and the second electrode pattern 110b has a plurality of second strip electrodes 124 and a plurality of second slits 122, which a line width of the second strip electrode 124 is L2 and a width of the second slits 122 is S2 (as shown in FIG. 3D), where each of the width S2 of the second slits 122 is less than the width S of the main pixel slits 102. However, the invention is not limited thereto. In other embodiments, the width S1 of the first slits 112 is, for example, equal to the width S of the main pixel slits 102, and the width S2 of the second slits 122 is, for example, less than the width S of the main pixel slits 102.

The first electrode pattern 120a is connected to the second electrode pattern 120b, and the first electrode pattern 120a and the second electrode pattern 120b share the same driving voltage. The main pixel electrode 100 has a main line width/slit width ratio (L/S), the first electrode pattern 120a of the sub-pixel electrode 120 has a first line width/slit width ratio (L1/S1), the second electrode pattern 120b of the sub-pixel electrode 120 has a second line width/slit width ratio (L2/S2), and the main line width/slit width ratio (L/S) of the main pixel electrode 100 is greater than the first line width/slit width ratio (L1/S1) of the first electrode pattern 110a. In one embodiment, the main line width L of the main pixel electrode 100 is equal to the first line width L1 of the first electrode pattern 120a. An area of the second electrode pattern 120b is about 5% to 80% of an area of the sub-pixel electrode 120.

Figure 4:
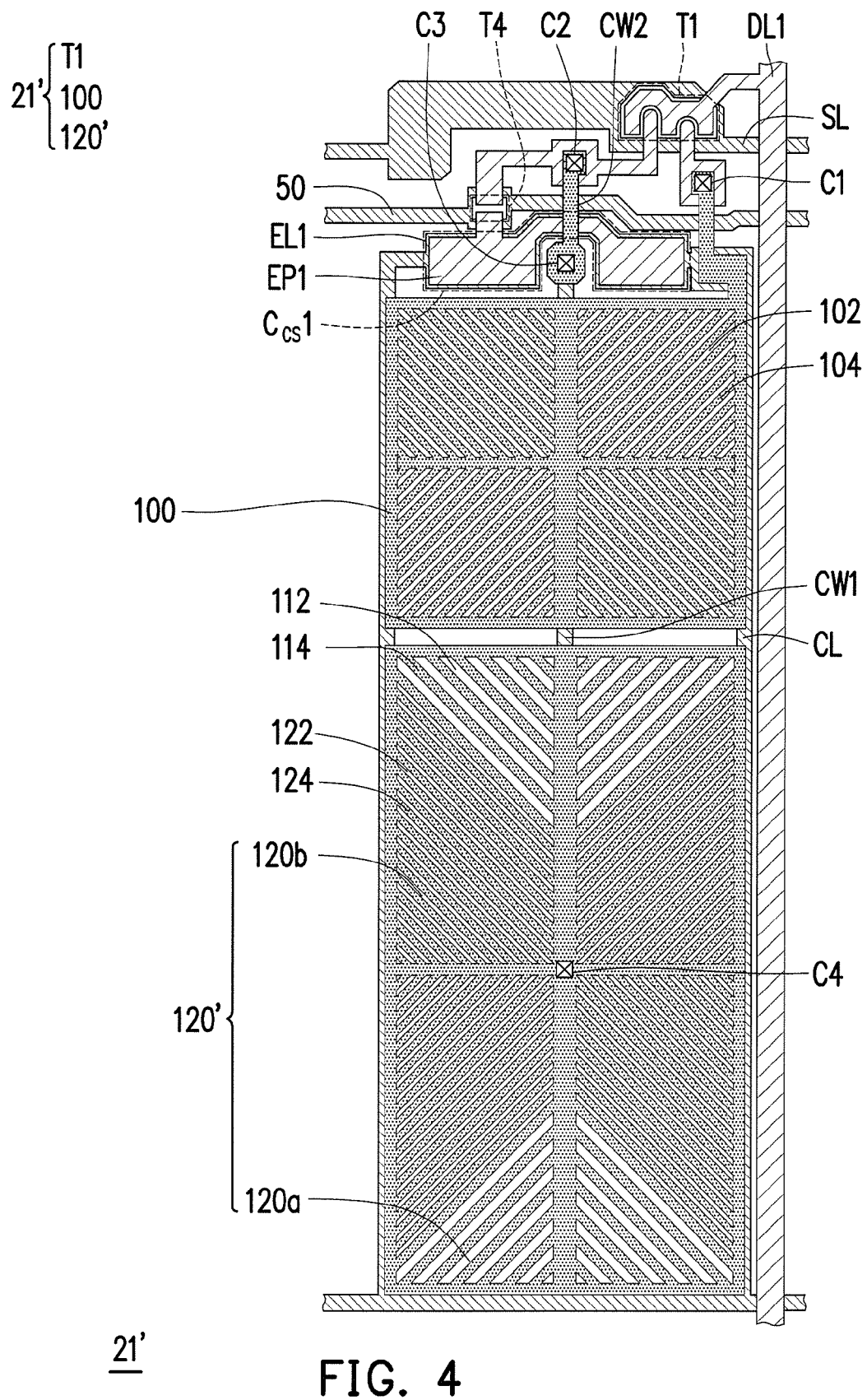
FIG. 4 is a schematic top view illustrating a pixel structure according to another embodiment of the invention.

Besides, the first electrode pattern 120a is located at the center of the sub-pixel electrode 120, and the second electrode pattern 120b is located on two opposite sides of the first electrode pattern 120a. However, the invention is not limited thereto. For example, FIG. 4 is a schematic top view illustrating a pixel structure according to another embodiment of the invention. Referring to FIG. 3A and FIG. 4 together, the pixel structure 21' depicted in FIG. 4 and the pixel structure 21 depicted in FIG. 3A is similar, the difference is that, for the pixel structure 21' depicted in FIG. 4, the second electrode pattern 120b is located at the center of the sub-pixel electrode 120', and the first electrode pattern 120a is located on two opposite sides of the second electrode pattern 120b (as shown in FIG. 4). In addition, in the pixel structure 21' depicted in FIG. 4, the width S2 of the second slit 122 of the second electrode pattern 120b of the sub-pixel electrode 120' is less than the width S of the main pixel slits 102 of the main pixel electrode 100, and the width S1 of the first slit 112 of the first electrode pattern 120a of the sub-pixel electrode 120' is equal to or greater than the width S of the main pixel slits 102 of the main pixel electrode 100.

The main pixel electrode 100 and the sub-pixel electrode 120 may be, for example, a transparent pixel electrode, a reflective pixel electrode or a transflective pixel electrode. The transparent pixel electrode comprises a metal oxide, such as indium tin oxide (ITO), indium zinc oxide (IZO), aluminum tin oxide (ATO), aluminum zinc oxide (AZO), indium-gallium-zinc oxide (IGZO) or any other suitable metal oxide material, or at least two of materials above stacked to each other. The reflective pixel electrode comprises a metal material having high reflectivity.

As described above, compared to the design of a conventional pixel structure, the design having the width S1 of the first slits 112 of the first electrode pattern 120a of the sub-pixel electrode 120 being greater than the width S of the main pixel slits 102 is employed in the pixel structure 21 of the present embodiment to weaken an electrical field of the first electrode pattern 120a, such that the first electrode pattern 120a of the sub-pixel electrode 120 has a larger threshold voltage, and thus the first electrode pattern 120a of the sub-pixel electrode 120 can be turned on later, thereby suppressing the phenomenon of yellow-bias at a high gray level. Furthermore, by employing the design having the width S2 of the second slits 122 of the second electrode pattern 120b of the sub-pixel electrode 120 being less than the width S of the main pixel slits 102, an electrical field of the second electrode pattern 120b becomes strong, such that the second electrode pattern 120b of the sub-pixel electrode 120 has a smaller threshold voltage, and thus the second electrode pattern 120b of the sub-pixel electrode 120 can be turned on earlier, thereby suppressing the phenomenon of yellow-bias and/or green-bias at a middle gray level. Therefore, the pixel structure of the present embodiment is capable of mitigating the problem of color shift in a side view image, as compared to the conventional pixel structure.

Figure 5A:
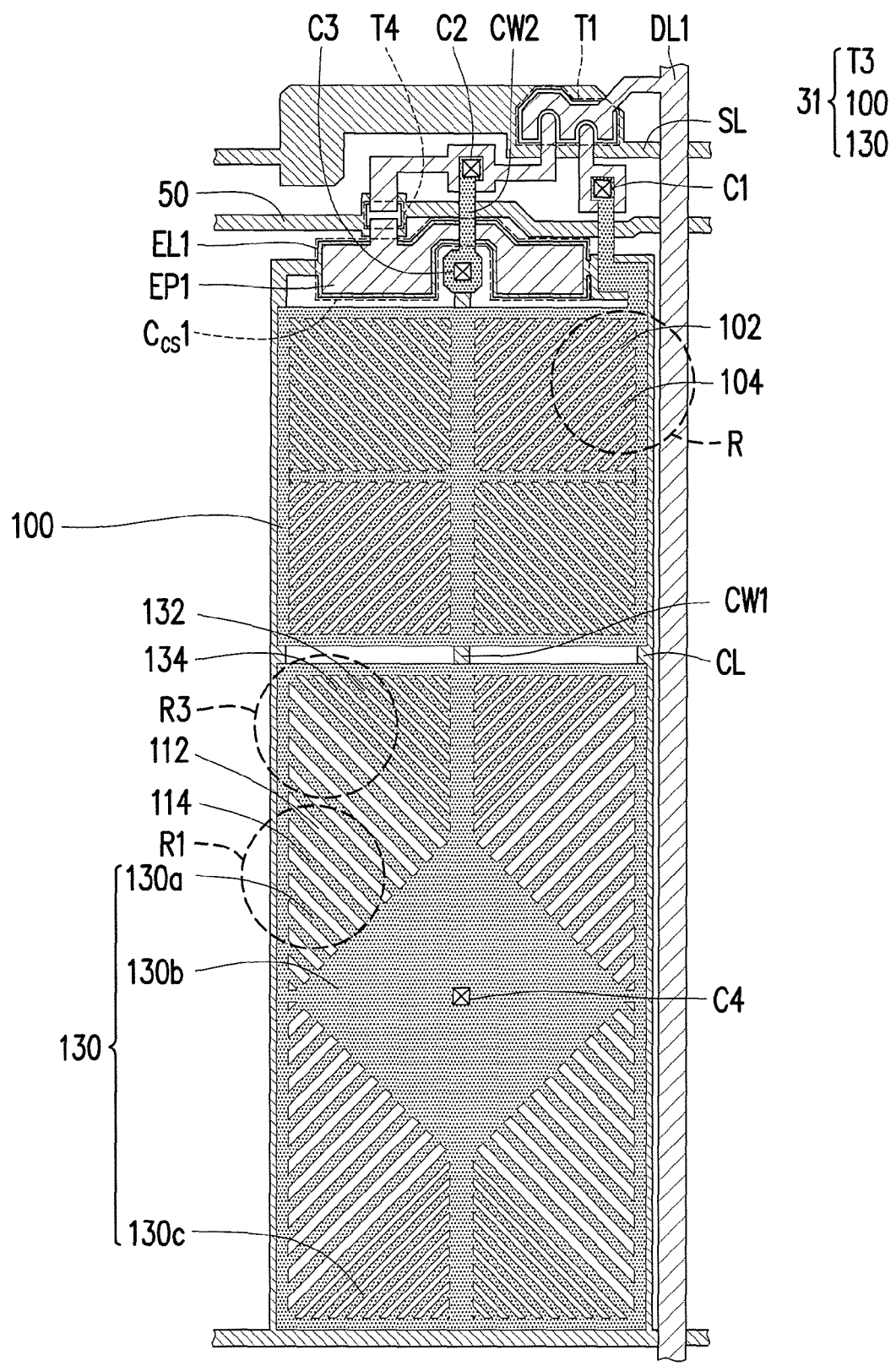
FIG. 5A is a schematic top view illustrating a pixel structure according to an embodiment of the invention.

FIG. 5A is a schematic top view illustrating a pixel structure according to an embodiment of the invention. Referring to FIG. 5A, a pixel structure 31 of the present embodiment includes a control device T1, a main pixel electrode 100, and a sub-pixel electrode 130. The pixel structure 31 further includes: a scan line SL, a data line DL1, a signal line 50, a sharing switch device T4, wirings CW1~CW2, a common line CL, a sharing capacitor Ccs1, a lower electrode EL1, a upper electrode EP1, and contact windows C1~C4. The pixel structure 31 of the present embodiment is similar to the pixel structure 11 of FIG. 1A and the pixel structure 21 of FIG. 3A, so that the same or similar devices are represented by the same or similar symbols, and details thereof are no repeated. A difference between the pixel structure 31 and the pixel structures 11, 12 is that, the pixel structure 31 is replacing the sub-pixel electrodes 110, 120 with the sub-pixel electrode 130.

As shown in FIG. 5A, the pixel structure 31 includes the main pixel electrode 100 and the sub-pixel electrode 130. Here, the common line CL is coupled to the main pixel electrode 100 and the sub-pixel electrode 130 to form a storage capacitor (not marked). The control device T1 is electrically connected to the main pixel electrode 100 through the contact window C1. The control device T1 is electrically connected to the sub-pixel electrode 130 through the wirings CW1~CW2 and the contact windows C2~C4. The main pixel electrode 100 and the sub-pixel electrode 130 have different driving voltages.

Figure 5B:
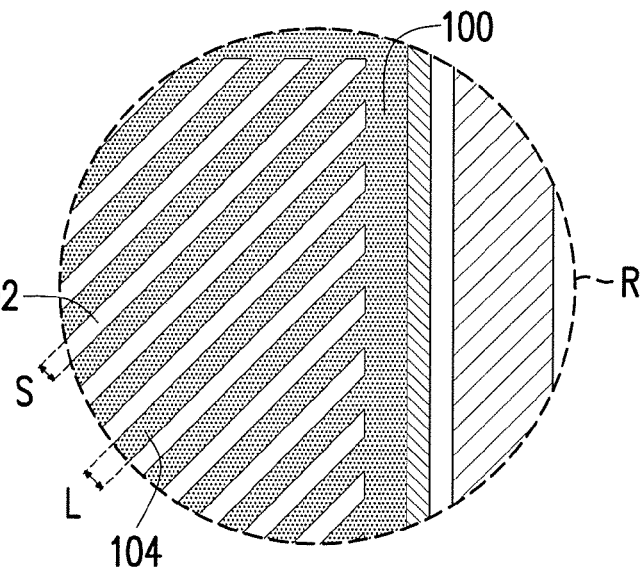
FIGS. 5B-5D are schematic partial views illustrating the pixel structure depicted in FIG. 5A.
Figure 5C:
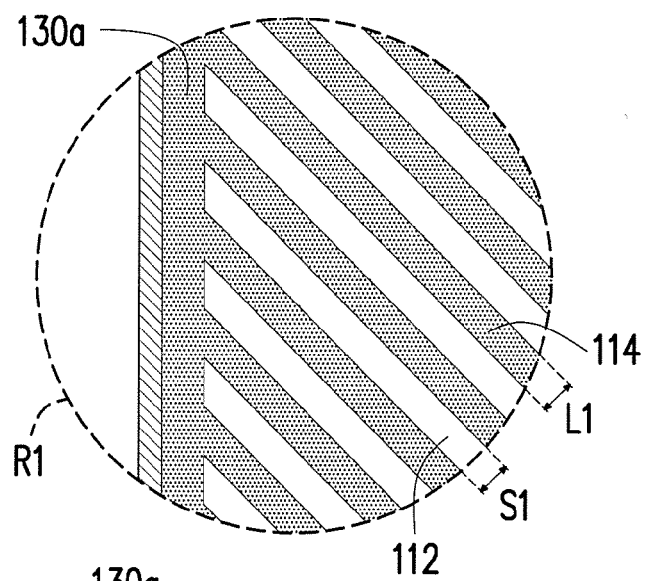
Figure 5D:
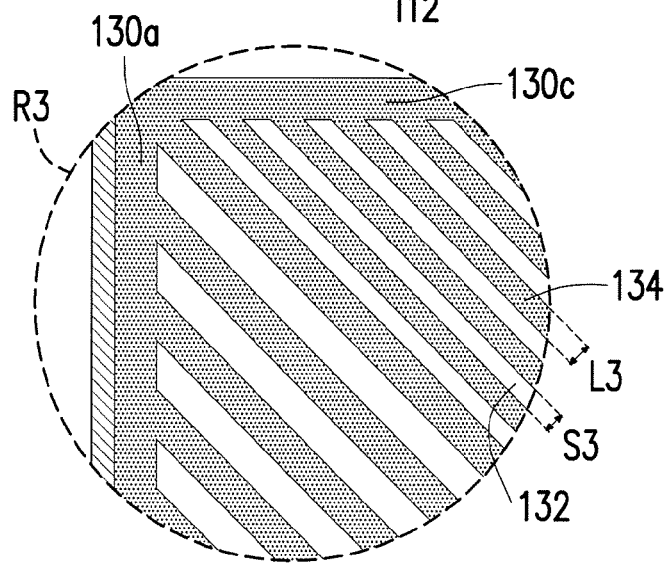

FIGS. 5B-5D are schematic partial views illustrating the pixel structure depicted in FIG. 5A, in which FIG. 5B-5D respectively illustrates the R region, the R1 region and the R3 region in FIG. 5A, where the R region in FIG. 5B is a partial enlarged view of the main pixel electrode 100, the R1 region in FIG. 5C is a partial enlarge view of the first electrode pattern 130a of the sub-pixel electrode 130, and the R3 region in FIG. 5D is a partial enlarge view of the third electrode pattern 130c of the sub-electrode 130. Referring FIG. 5A to FIG. 5D together, the main pixel electrode 100 has a plurality of main pixel strip electrodes 104 and a plurality of main pixel slits 102, which a line width of the main pixel strip electrodes 104 is L, and a width of the main pixel slits 102 is S (as shown in FIG. 5B). The sub-pixel electrode 130 has the first electrode pattern 130a, the second electrode pattern 130b and the third electrode pattern 130c. In the present embodiment, the first electrode pattern 130a has a plurality of first strip electrodes 114 and a plurality of first slits 112, which a line width of the first strip electrode 114 is L1 and a width of the first slits is S1 (as shown in FIG. 5C), where each of the width S1 of the first slits 112 is greater than the width S of the main pixel slits 102. The second electrode pattern 130b has no slits. The third electrode pattern 130c has a plurality of third strip electrodes 134 and a plurality of third slits 132, which a line width of the third strip electrodes 134 is L3 and a width of the third slits 132 is S3 (as shown in FIG. 5D), where each of the width S3 of the third slits 132 is equal to the width S of the main pixel slits 102. However, the invention is not limited thereto. In one embodiment, each of the width S1 of the first slits 112 is greater than the width S of the main pixel slits 102, the second electrode pattern 110b has no slits, and each of the width S3 of the third slits 132 is less than the width S of the main pixel slits 102. In one embodiment, each of the width S1 of the first slits 112 is equal to the width S of the main pixel slits 102, the second electrode pattern 110b has no slits, and each of the width S3 of the third slits 132 is less than the width S of the main pixel slits 102. In another embodiment, each of the width S1 of the first slits 112 is equal to the width S of the main pixel slits 102, the second electrode pattern 110b has no slits, and each of the width S3 of the third slits 132 is less than the width S1 of the first slits 112. Furthermore, in other embodiments, the second electrode pattern 130b may also have a plurality of second slits (not illustrated), which the second slits has a width S2 (not illustrated) which is less than the width S3 of the third slits 132. In other words, each of the width S1 of the first slits 112 is equal to or greater than the width S of the main pixel slits 102; each of the width S3 of the third slits 132 is less than the width S1 of the first slits 112 and is less than or equal to the width S of the main pixel slits 102; and the second electrode pattern 130b has no slits or a plurality of the second slits, in which when the second electrode pattern 130b has the second slits, each of the width S2 of the second slits is less than the width S of the main pixel slits 102 and is less than the width S3 of the third slits 132.

The first electrode pattern 130a is connected to the second electrode pattern 130b and the third electrode pattern 130c, and the first electrode pattern 130a, the second electrode pattern 130b and the third electrode pattern 130c share the same driving voltage. The main pixel electrode 100 has a main line width/slit width ratio (L/S), the first electrode pattern 130a of the sub-pixel electrode 130 has a first line width/slit width ratio (L1/S1), the third electrode pattern 130c of the sub-pixel electrode 130 has a third line width/slit width ratio (L3/S3), and the main line width/slit width ratio (L/S) of the main pixel electrode 100 is greater than the first line width/slit width ratio (L1/S1) of the first electrode pattern 130a. In one embodiment, the main line width L of the main pixel electrode 100 is equal to the first line width L1 of the first electrode pattern 130a. In the present embodiment, the main line width/slit width ratio (L/S) of the main pixel electrode 100 is, for example, (4/2), the first line width/slit ratio (L1/S1) of the first electrode pattern 130a is, for example, (4/4), and the third line width/slit width ratio (L3/S3) of the third electrode pattern 130c is, for example, (4/2). However, the invention is not limited thereto. An area of the second electrode pattern 130b is about 5% to 80% of an area of the sub-pixel electrode 130. In the present embodiment, the second electrode pattern 130b is located at the center of the sub-pixel electrode 130, the first electrode pattern 130a is located on two opposite sides of the second electrode pattern 130b, and the third electrode pattern 130c is located on other two opposite sides of the second electrode pattern 130b.

The main pixel electrode 100 and the sub-pixel electrode 130 may be, for example, a transparent pixel electrode, a reflective pixel electrode or a transflective pixel electrode. The transparent pixel electrode comprises a metal oxide, such as indium tin oxide (ITO), indium zinc oxide (IZO), aluminum tin oxide (ATO), aluminum zinc oxide (AZO), indium-gallium-zinc oxide (IGZO) or any other suitable metal oxide material, or at least two of materials above stacked to each other. The reflective pixel electrode comprises a metal material having high reflectivity.

As described above, compared to the design of a conventional pixel structure, the design having the width S1 of the first slits 112 of the first electrode pattern 130a of the sub-pixel electrode 130 being greater than the width S of the main pixel slits 102 is employed in the pixel structure 31 of the present embodiment to weaken an electrical field of the first electrode pattern 130a, such that the first electrode pattern 130a of the sub-pixel electrode 130 has a larger threshold voltage, and thus the first electrode pattern 130a of the sub-pixel electrode 130 can be turned on later, thereby suppressing the phenomenon of yellow-bias at a high gray level. Also, by employing the design of the second electrode pattern 130b of the sub-pixel electrode 130 having no slits and the width S3 of the third slits 132 of the third electrode pattern 130c of the sub-pixel electrode 130 being less than the width S of the main pixel slits 102, electrical fields of the second electrode pattern 130b and the third electrode pattern 130c become strong, such that each of the second electrode pattern 130b and the third electrode pattern 130c of the sub-pixel electrode 130 has a smaller threshold voltage, and thus the second electrode pattern 130b and the third electrode pattern 130c of the sub-pixel electrode 130 can be turned on earlier, thereby suppressing the phenomenon of yellow-bias and/or green-bias at a middle gray level. Therefore, the pixel structure of the present embodiment is capable of mitigating the problem of color shift in a side view image, as compared to the conventional pixel structure.

Figure 6A:
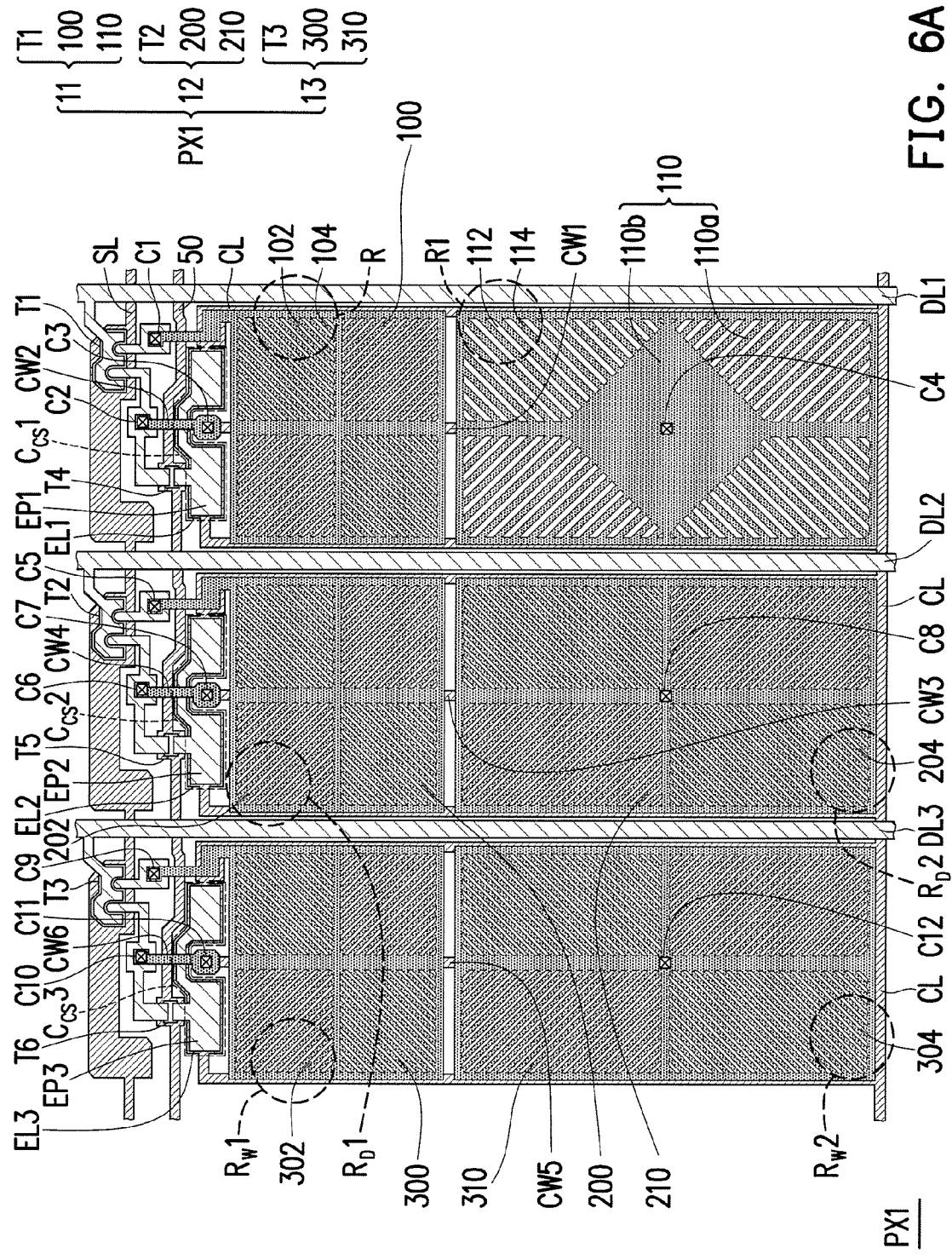
FIG. 6A is a schematic top view illustrating an embodiment of a pixel array having the pixel structure of FIG. 1A.

FIG. 6A is a schematic top view illustrating an embodiment of a pixel array having the pixel structure of FIG. 1A. Referring to FIG. 6A, a pixel array PX1 of the present embodiment includes a first pixel structure 11, a second pixel structure 12, and a third pixel structure 13. The first pixel structure 11 includes a first control device T1, a first main pixel electrode 100, and a first sub-pixel electrode 110.

The second pixel structure 12 includes a second control device T2, a second main pixel electrode 200, and a second sub-pixel electrode 210. The third pixel structure 13 includes a third control device T3, a third main pixel electrode 300, and a third sub-pixel electrode 310. The first pixel structure 11 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4 The second pixel structure 12 further includes: a scan line SL, a data line DL2, a signal line 50, a sharing switch device T5, wirings CW3~CW4, a common line CL, a sharing capacitor $C_{cs}2$, a lower electrode EL2, a upper electrode EP2, and contact windows C5~C8. The third pixel structure 13 further includes: a scan line SL, a data line DL3, a signal line 50, a sharing switch device T6, wirings CW5~CW6, a common line CL, a sharing capacitor $C_{cs}3$, a lower electrode EL3, a upper electrode EP3, and contact windows C9~C12.

Extension directions of the scan line SL and the signal line 50 are different from an extension direction of the data lines DL1~DL3. It is preferred that the extension directions of the scan line SL and the signal line 50 are perpendicular to the extension direction of the data lines DL1~DL3. The scan line SL and the signal line 50 are, for example, located in the same layer or different layers, and the scan line SL and the signal line 50 are electrically isolated from one another and are not overlapping with each other. In addition, the scan line SL and the data lines DL1~DL3 are located in different layers, and sandwich an insulating layer (not illustrated) therebetween; and the signal line 50 and the data lines DL1~DL3 are located in different layers, and sandwich an insulating layer (not illustrated) therebetween. The scan line SL and the data lines DL1~DL3 are mainly configured to transmit a driving signal for driving the first, second and third pixel structure 11~13. In view of conductivity, the scan line SL, the signal line 50 and the data lines DL1~DL3 are generally made of metal materials. However, the invention is not limited thereto. According to other embodiments, the scan line SL, the signal line 50 and the data lines DL1~DL3 may also be made of other conductive materials, such as alloys, metal oxides, metal nitrides, metal oxynitrides or stacked layers of metal materials and other conductive materials.

The first control device T1 is electrically connected to the scan line SL and the data line DL1. The second control device T2 is electrically connected to the scan line SL and the data line DL2. The third control device T3 is electrically connected to the scan line SL and the data line DL3. Here, the first, second and third control devices T1~T3 are, for example, thin film transistors (TFTs). In the embodiment, the first, second and third control devices T1~T3 of bottom-gate thin film transistors are provided as an example. However, the invention is not limited thereto. In other embodiments, the first, second and third control devices T1~T3 may be top-gate thin film transistors.

The sharing switch devices T4~T6 are, for example, the TFTs. The sharing switch devices T4 is electrically connected to the signal line 50 and is further electrically to the first control device T1. The sharing switch devices T5 is electrically connected to the signal line 50 and is further electrically to the second control device T2. The sharing switch devices T6 is electrically connected to the signal line 50 and is further electrically to the third control device T3. In the embodiment, the sharing switch devices T4~T6 of bottom-gate thin film transistors are provided as an example. However, the invention is not limited thereto. In other embodiments, the sharing switch devices T4~T6 may be top-gate thin film transistors. Referring to FIG. 6A, the sharing capacitor $C_{cs}1$ is composed of the lower electrode EL1 and the upper electrode EP1, the sharing capacitor $C_{cs}2$ is composed of the lower electrode EL2 and the upper electrode EP2, and the sharing capacitor $C_{cs}3$ is composed of the lower electrode EL3 and the upper electrode EP3. The lower electrodes EL1~EL3, the scan line SL and the signal line 50 are, for example, located in the same layer. Each of the upper electrodes EP1~EP3 is respectively disposed above the corresponding lower electrodes EL1~EL3 and is respectively electrically connected to the sharing switch devices T4~T6. The upper electrodes EP1~EP3 and the data lines DL1~DL3 are, for example, located in the same layer. The common line CL is located under the first main pixel electrode 100/the first sub-pixel electrode 110, second main pixel electrode 200/the second sub-pixel electrode 210, and third main pixel electrode 300/the third sub-pixel electrode 310. The wirings CW1, CW3 and CW5 are located under the first main pixel electrode 100/the first sub-pixel electrode 110, second main pixel electrode 200/the second sub-pixel electrode 210, and third main pixel electrode 300/the third sub-pixel electrode 310, respectively. Here, the common line CL is coupled to the first main pixel electrode 100/the first sub-pixel electrode 110, second main pixel electrode 200/the second sub-pixel electrode 210, and third main pixel electrode 300/the third sub-pixel electrode 310 to form storage capacitors (not marked). The first control device T1 is electrically connected to the first main pixel electrode 100 through the contact window C1, the second control device T2 is electrically connected to the second main pixel electrode 200 through the contact window C5, and the third control device T3 is electrically connected to the third main pixel electrode 300 through the contact window C9. The first control device T1 is electrically connected to the first sub-pixel electrode 110 through the wirings CW1~CW2 and the contact windows C2~C4. The second control device T2 is electrically connected to the second sub-pixel electrode 210 through the wirings CW3~CW4 and the contact windows C6~C8. The third control device T3 is electrically connected to the third sub-pixel electrode 310 through the wirings CW5~CW6 and the contact windows C10~C12. In the embodiment, the common line CL and the wirings CW1, CW3, CW5 are, for example, located in the same layer with the scan line SL, the signal line 50, and the lower electrodes EL1~EL3 The wirings CW2, CW4, CW6 are, for example, located in the same layer with the first main pixel electrode 100, the first sub-pixel electrode 110, second main pixel electrode 200, the second sub-pixel electrode 210, third main pixel electrode 300, and the third sub-pixel electrode 310. However, the invention is not limited thereto.

As mentioned above, the pixel array PX1 of the present embodiment includes a first pixel structure 11, a second pixel structure 12, and a third pixel structure 13. The first pixel structure 11 includes a first control device T1, a first main pixel electrode 100, and a first sub-pixel electrode 110. The second pixel structure 12 includes a second control device T2, a second main pixel electrode 200, and a second sub-pixel electrode 210. The third pixel structure 13 includes a third control device T3, a third main pixel electrode 300, and a third sub-pixel electrode 310. The first main pixel electrode 100 is electrically connected to the first control device T1 through the contact window C1, and the first sub-pixel electrode 110 is electrically connected to the first control device T1 through the wirings CW1~CW2 and the contact windows C2~C4. The second main pixel electrode 200 is electrically connected to the second control device T2 through the contact window C5, and the second sub-pixel electrode 210 is electrically connected to the second control device T2 through the wirings CW3~CW4 and the contact windows C6~C8. The third main pixel electrode 300 is electrically connected to the third control device T3 through the contact window C9, and the third sub-pixel electrode 310 is electrically connected to the third control device T3 through the wirings CW5~CW6 and the contact windows C10~C12.

As the above, when the first, second and third control devices T1~T3 are turned on as being driven by the scan line SL and the data lines DL1~DL3, driving voltages are respectively transmitted to the first main pixel electrode 100 and the first sub-pixel electrode 110, the second main pixel electrode 200 and the second sub-pixel electrode 210, and the third main pixel electrode 300 and the third sub-pixel electrode 310, through the first, second and third control devices T1~T3. By this, the sharing switch devices T4~T6 and the sharing capacitors $C_{cs}1$ ~$C_{cs}3$ are turned on through the control of the signal line 50, such that there is a voltage difference the first main pixel electrode 100 and the first sub-pixel electrode 110, between the second main pixel electrode 200 and the second sub-pixel electrode 210, and between the third main pixel electrode 300 and the third sub-pixel electrode 310. Accordingly, based on such connection relationship of the first, second and third control device T1~T3, the sharing switch devices T4~T6, and the sharing capacitor $C_{cs}1$~$C_{cs}3$, the first main pixel electrode 100 and the first sub-pixel electrode 110 have different driving voltages, the second main pixel electrode 200 and the second sub-pixel electrode 210 have different driving voltages, and the third main pixel electrode 300 and the third sub-pixel electrode 310 have different driving voltages.

Figure 6B:
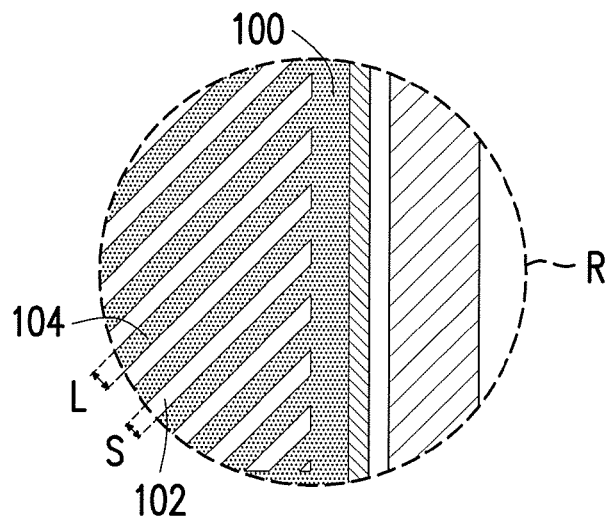
FIGS. 6B-6G are schematic partial views illustrating the pixel structures depicted in FIG. 6A.
Figure 6C:
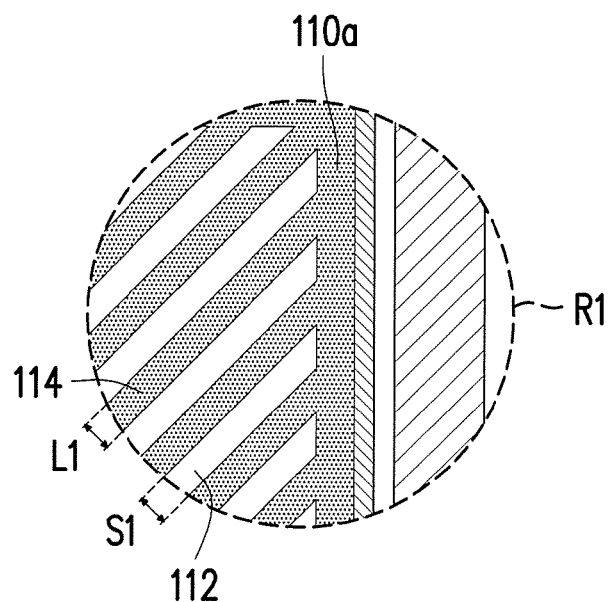
Figure 6D:
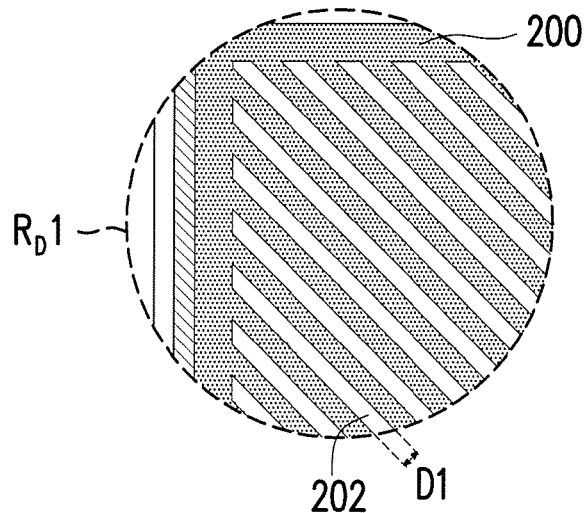
Figure 6E:
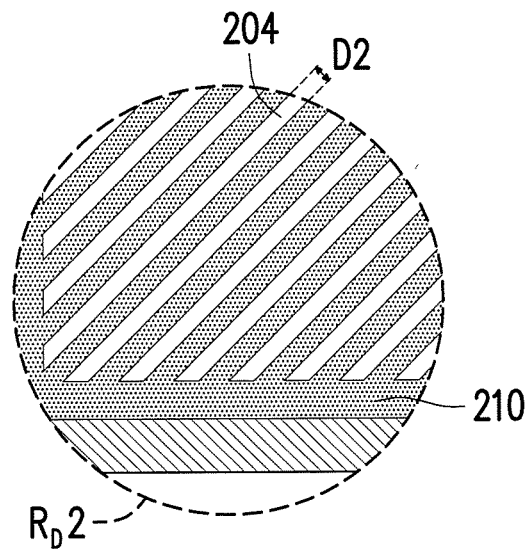
Figure 6F:
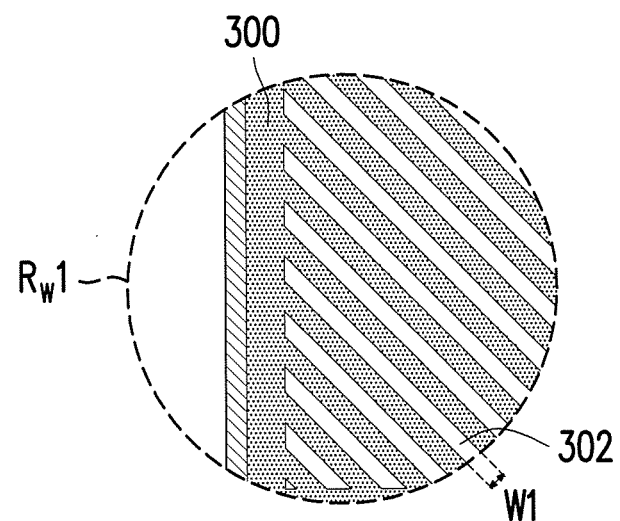
Figure 6G:
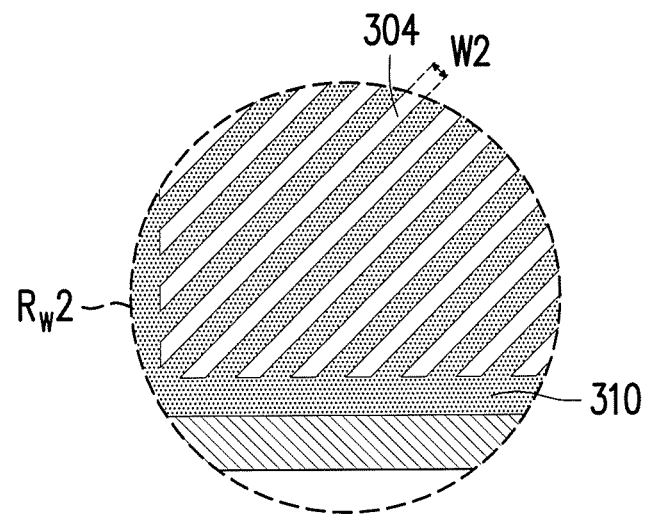

FIGS. 6B-6G are schematic partial views illustrating the pixel structures depicted in FIG. 6A, in which FIGS. 6B-6G respectively illustrates the R region, the R1 region, the $R_D1$ region, the $R_D2$ region, the $R_W1$ region and the $R_W2$ region in the first, second and third pixel structures 11~13 of FIG. 6A. The R region in FIG. 6B is a partial enlarged view of the first main pixel electrode 100, the R1 region in FIG. 6C is a partial enlarge view of a first electrode pattern 110a of the first sub-pixel electrode 110, the $R_D1$ region in FIG. 6D is a partial enlarged view of the second main pixel electrode 200, the $R_D2$ region in FIG. 6E is a partial enlarge view of the second sub-pixel electrode 210, the $R_W1$ region in FIG. 6F is a partial enlarged view of the third main pixel electrode 300, and the $R_W2$ region in FIG. 6G is a partial enlarge view of the third sub-pixel electrode 310. Referring FIG. 6A to FIG. 6C together, the first main pixel electrode 100 has a plurality of first main pixel strip electrodes 104 and a plurality of first main pixel slits 102, which a line width of the first main pixel strip electrodes 104 is L, and a width of the first main pixel slits 102 is S (as shown in FIG. 6B); and the first sub-pixel electrode 110 has the first electrode pattern 110a and the second electrode pattern 110b. In the present embodiment, the first electrode pattern 110a has a plurality of first strip electrodes 114 and a plurality of first slits 112, which a line width of the first strip electrode 114 is L1 and a width of the first slits 112 is S1 (as shown in FIG. 6C), where each of the width S1 of the first slits 112 is greater than the width S of the first main pixel slits 102; and the second electrode pattern 110b has no slits. However, the invention is not limited thereto. In other embodiments, the width S1 of the first slits 112 is, for example, equal to the width S of the first main pixel slits 102, and the second electrode pattern 110b, for example, has no slits.

The first electrode pattern 110a is connected to the second electrode pattern 110b, and the first electrode pattern 110a and the second electrode pattern 110b share the same driving voltage. The first main pixel electrode 100 has a main line width/slit width ratio (L/S), the first electrode pattern 110a of the first sub-pixel electrode 110 has a first line width/slit width ratio (L1/S1), and the main line width/slit width ratio (L/S) of the first main pixel electrode 100 is greater than the first line width/slit width ratio (L1/S1) of the first electrode pattern 110a. In one preferable embodiment, the main line width L of the first main pixel electrode 100 is equal to the first line width L1 of the first electrode pattern 110a. In the present embodiment, the main line width/slit width ratio (L/S) of the first main pixel electrode 100 is, for example, (4/2), and the first line width/slit width ratio (L1/S1) of the first electrode pattern 110a is, for example, (4/4). However, the invention is not limited thereto. In the present embodiment, an area of the second electrode pattern 110b is about 5% to 80% of an area of the first sub-pixel electrode 110. In present the embodiment, the second electrode pattern 110b is located at the center of the first sub-pixel electrode 110, and the first electrode pattern 110a is located on two opposite sides of the second electrode pattern 110b. However, in the other embodiments, the first electrode pattern 110a is located at the center of the first sub-pixel electrode 110, and the second electrode pattern 110b is located on two opposite sides of the first electrode pattern 110a. Furthermore, a shape of the second electrode pattern 110b may be, for example, quadrangle, hexagonal, and polygonal.

Referring FIG. 6A and FIG. 6D~FIG. 6E together, in the second pixel structure 12, the second main pixel electrode 200 has a plurality of second main pixel strip electrodes (not marked) and a plurality of second main pixel slits 202, where a width of each of the second main pixel slit 202 is D1 (as shown in FIG. 6D); the second sub-pixel electrode 210 has a plurality of second sub-pixel strip electrodes (not marked) and a plurality of second sub-pixel slits 204, where a width of each of the second sub-pixel slits 204 is D2 (as shown in FIG. 6E); and the width D2 of the second sub-pixel slits 204 is equal to the width D1 of the second main pixel slits 202. Referring FIG. 6A and FIG. 6F~FIG. 6G together, in the third pixel structure 13, the third main pixel electrode 300 has a plurality of third main pixel strip electrodes (not marked) and a plurality of third main pixel slits 302, where a width of each of the third main pixel slit 302 is W1 (as shown in FIG. 6F); the third sub-pixel electrode 310 has a plurality of third sub-pixel strip electrodes (not marked) and a plurality of third sub-pixel slits 304, where a width of each of the third sub-pixel slits 304 is W2 (as shown in FIG. 6G); and the width W2 of the third sub-pixel slits 304 is equal to the width W1 of the third sub-pixel slits 302. In the present embodiment, the width D1 of the second main pixel slits 202, the width W1 of the third main pixel slits 302 and the width S of the first main pixel slits 102 are the same. Namely, the first main pixel electrode 100, the second main pixel electrode 200, the second sub-pixel electrode 210, the third main pixel electrode 300 and the third sub-pixel electrode 310 have the same line width/slit width ratio, e.g., the main line width/slit width ratio (L/S) of the first main pixel electrode 100, (4/2), as an example. Furthermore, in the present embodiment, the first pixel structure 11 is a blue pixel structure; and the second pixel structure 12 and the third pixel structure 13 are, for example, a green pixel structure and a red pixel structure, respectively.

The first main pixel electrode 100, the first sub-pixel electrode 110, second main pixel electrode 200, the second sub-pixel electrode 210, third main pixel electrode 300, and the third sub-pixel electrode 310 may be, for example, a transparent pixel electrode, a reflective pixel electrode or a transflective pixel electrode. The transparent pixel electrode comprises a metal oxide, such as indium tin oxide (ITO), indium zinc oxide (IZO), aluminum tin oxide (ATO), aluminum zinc oxide (AZO), indium-gallium-zinc oxide (IGZO) or any other suitable metal oxide material, or at least two of materials above stacked to each other. The reflective pixel electrode comprises a metal material having high reflectivity.

As described above, compared to the design of a conventional pixel array, the design having the width S1 of the first slits 112 of the first electrode pattern 110a of the first sub-pixel electrode 110 being greater than the width S of the first main pixel slits 102 is employed in the first pixel structure 11 of the pixel array PX1 of the present embodiment, such that the first electrode pattern 110a of the first sub-pixel electrode 110 has a larger threshold voltage, thereby suppressing the phenomenon of yellow-bias at a high gray level. At the same time, by employing the design of the second electrode pattern 110b of the first sub-pixel electrode 110 having no slits, the second electrode pattern 110b of the first sub-pixel electrode 110 has a smaller threshold voltage, thereby suppressing the phenomenon of yellow-bias and/or green-bias at a middle gray level. Besides, since the second electrode pattern 110b of the first sub-pixel electrode 110, for example, has a diamond shape which is located at the center of the first sub-pixel electrode 110, in that way, the first pixel structure 11 of the pixel array PX1 of the present embodiment has the advantage of liquid crystal tilt. Therefore, the pixel array of the present embodiment is capable of mitigating the problem of color shift in a side view image, as compared to the conventional pixel array.

Figure 7:
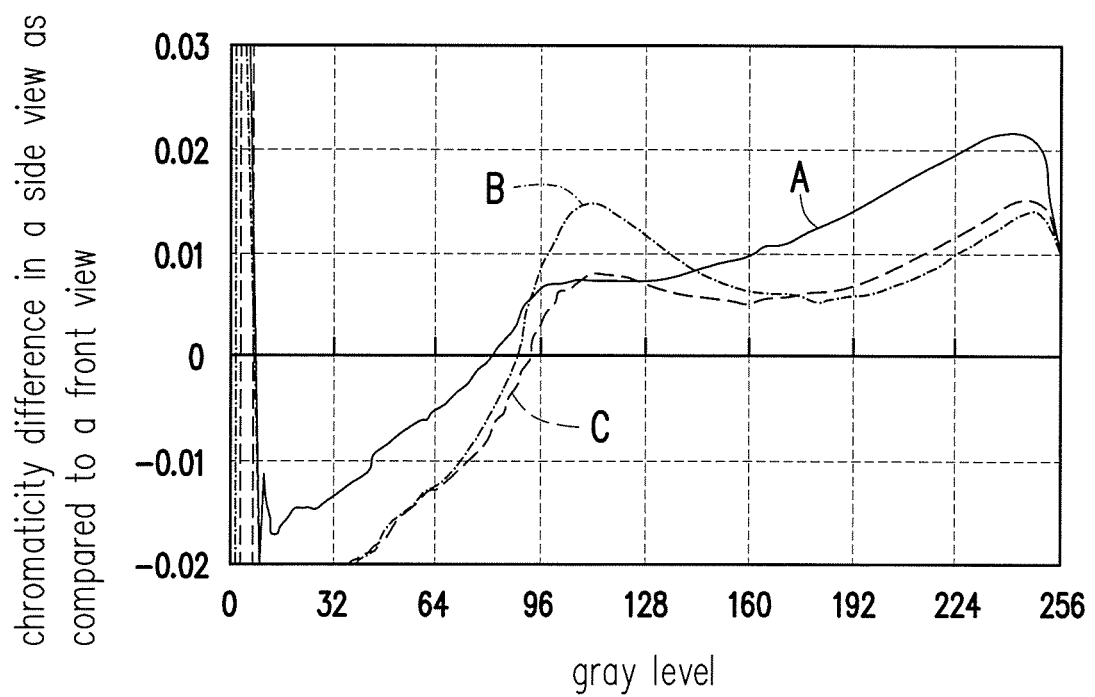
FIG. 7 is a graph showing the relationship between the gray level and chromaticity difference (e.g., a side view as compared to a front view) of a liquid crystal display panel having the pixel array of FIG. 6A.

FIG. 7 is a graph showing the relationship between the gray level and chromaticity difference (e.g., a side view as compared to a front view image) of the liquid crystal display panel of FIG. 6A. In FIG. 7, a curve A denotes a gray-level and chromaticity difference (e.g., a side view as compared to a front view image) relationship obtained from viewing a LCD having the conventional pixel array at a 45° viewing angle, in which a line width/slit width ratio of the main pixel electrode and a line width/slit width ratio of the sub-pixel electrode of the blue, green and red pixel structures are the same (e.g., 4/2). A curve B denotes a gray-level and chromaticity difference (e.g., a side view as compared to a front view image) relationship obtained from viewing a LCD having the conventional pixel array at a 45° viewing angle, in which a line width/slit width ratio of the main pixel electrode of the blue, green and red pixel structures are the same (e.g., 4/2), a line width/slit width ratio of the sub-pixel electrode of the green and red pixel structures are the same (e.g., 4/4), and a line width/slit width ratio of the sub-pixel electrode of the blue pixel structure is, for example, 4/4. For clarification, the blue, green and red pixel structures of the aforementioned conventional pixel arrays are employed the same pixel structure; and for a instance, the aforementioned conventional pixel arrays are composed of the second pixel structure 12 or the third pixel structure 13 of the pixel array PX1 of FIG. 6A. A curve C denotes a gray-level and chromaticity difference (e.g., a side view as compared to a front view image) relationship obtained from viewing a LCD having the pixel array PX1 of FIG. 6A at a 45° viewing angle. According to FIG. 7, in case of a large viewing angle (side view), compared to a front view image, a side view image of the LCDs having the conventional pixel array still goes greenish or yellowish at a mid gray level and goes yellowish at a high gray level. However, when the LCD is employed the pixel array PX1 of FIG. 6A, the chromaticity difference problem (e.g., green-bias or yellow-bias at a mid gray level and yellow-bias at a high gray level) of a side view image is certainly being mitigated.

Figure 8A:
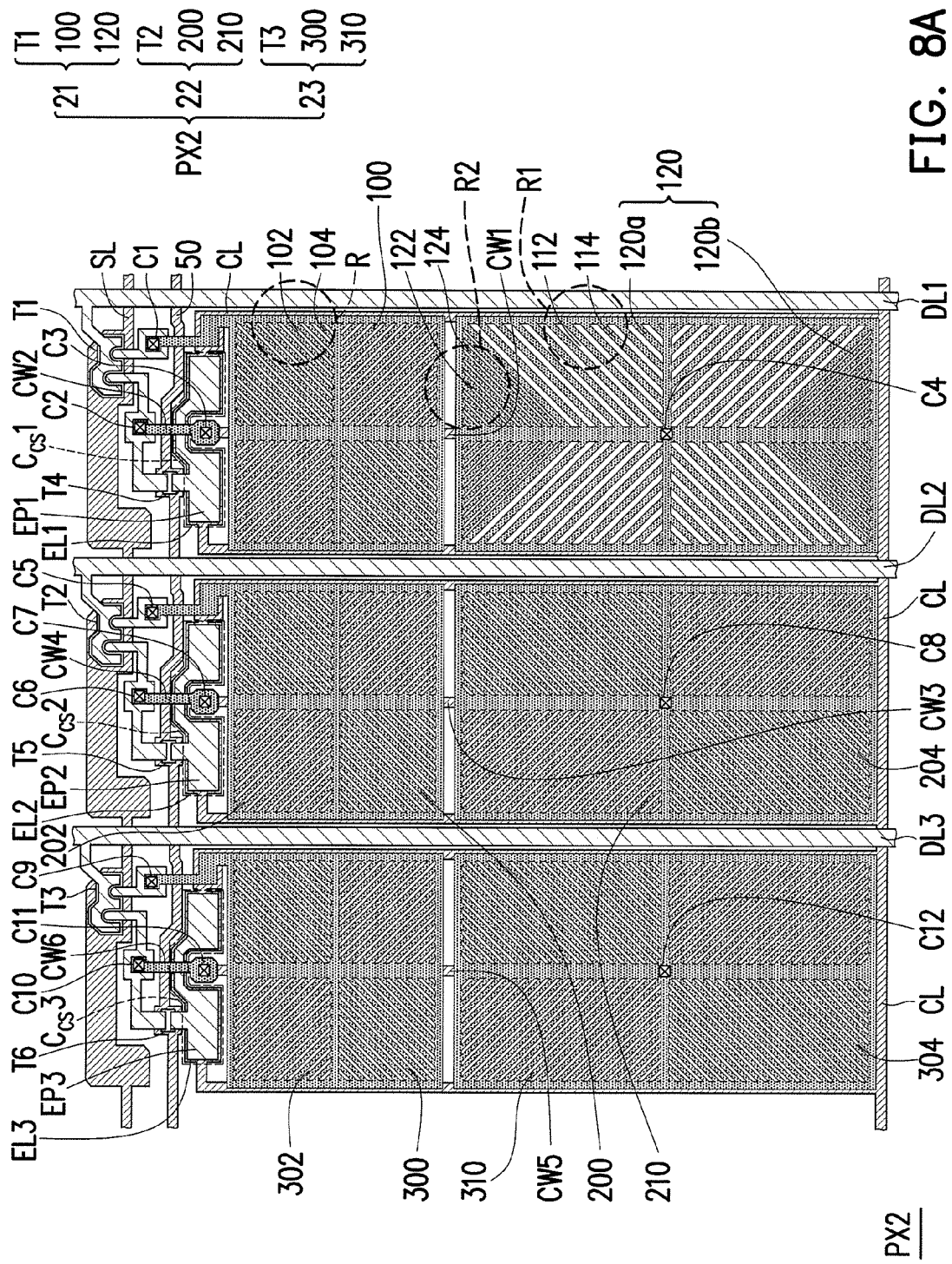
FIG. 8A is a schematic top view illustrating an embodiment of a pixel array having the pixel structure of FIG. 3A.

FIG. 8A is a schematic top view illustrating an embodiment of a pixel array having the pixel structure of FIG. 3A. The pixel array PX2 of the present embodiment is similar to the pixel array PX1 of FIG. 6A. Specifically, the first pixel structure 21 of FIG. 8A is similar to the pixel structure 21 of FIG. 3A, the second pixel structure 22 of FIG. 8A is similar to the second pixel structure 12 of FIG. 6A, and the third pixel structure 23 of FIG. 8A is similar to the third pixel structure 13 of FIG. 6A. Accordingly, the same or similar devices are represented by the same or similar symbols, and details thereof are no repeated. Please refer to the above detailed descriptions of FIG. 6A and FIGS. 6D~6G for the details of the second pixel structure 22 and the third pixel structure 23 of FIG. 8A. In the present embodiment, the first pixel structure 21 is a blue pixel structure; and the second pixel structure 22 and the third pixel structure 23 are, for example, a green pixel structure and a red pixel structure, respectively.

Referring to FIG. 8A, a pixel array PX2 of the present embodiment includes a first pixel structure 21, a second pixel structure 22, and a third pixel structure 23. The first pixel structure 21 includes a first control device T1, a first main pixel electrode 100, and a first sub-pixel electrode 120. The second pixel structure 22 includes a second control device T2, a second main pixel electrode 200, and a second sub-pixel electrode 210. The third pixel structure 23 includes a third control device T3, a third main pixel electrode 300, and a third sub-pixel electrode 310. Referring to FIG. 8A, the first pixel structure 21 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4; the second pixel structure 22 further includes: a scan line SL, a data line DL2, a signal line 50, a sharing switch device T5, wirings CW3~CW4, a common line CL, a sharing capacitor $C_{cs}2$, a lower electrode EL2, a upper electrode EP2, and contact windows C5~C8; and the third pixel structure 23 further includes: a scan line SL, a data line DL3, a signal line 50, a sharing switch device T6, wirings CW5~CW6, a common line CL, a sharing capacitor $C_{cs}3$, a lower electrode EL3, a upper electrode EP3, and contact windows C9~C12.

Here, the common line CL is coupled to the first main pixel electrode 100/the first sub-pixel electrode 120, second main pixel electrode 200/the second sub-pixel electrode 210, and third main pixel electrode 300/the third sub-pixel electrode 310 to form storage capacitors (not marked). The first main pixel electrode 100 and the first sub-pixel electrode 120 have different driving voltages, the second main pixel electrode 200 and the second sub-pixel electrode 210 have different driving voltages, and the third main pixel electrode 300 and the third sub-pixel electrode 310 have different driving voltages.

Figure 8B:
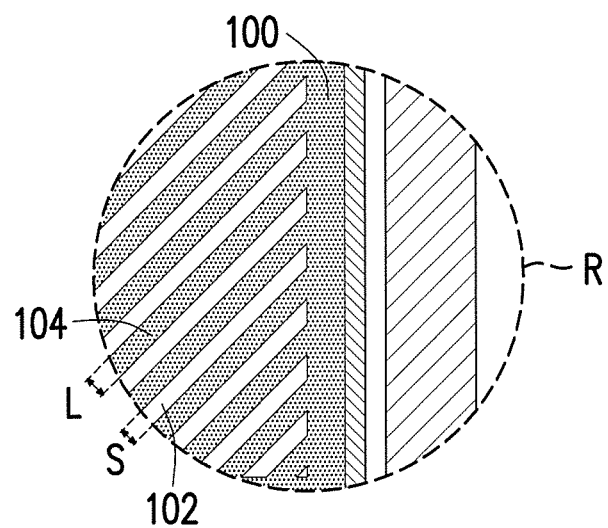
FIGS. 8B-8D are schematic partial views illustrating the pixel structures depicted FIG. 8A.
Figure 8C:
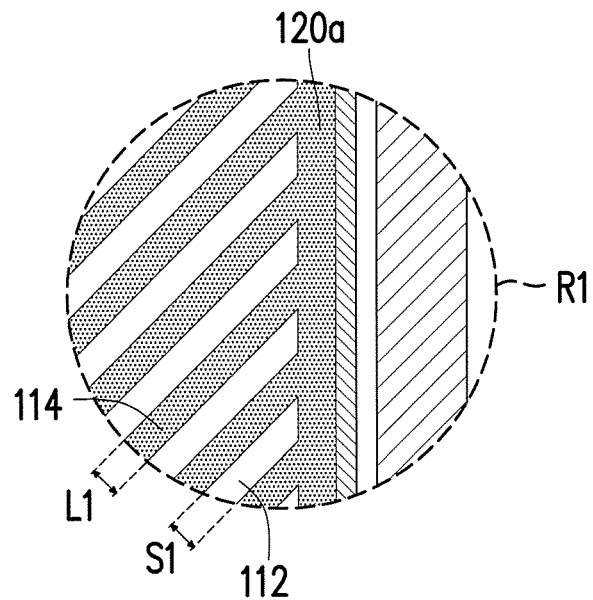
Figure 8D:
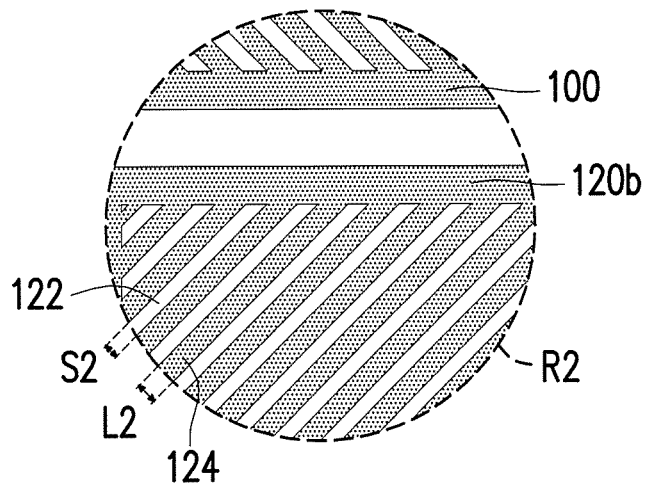

FIGS. 8B-8D are schematic partial views illustrating the pixel structure depicted FIG. 8A, in which FIG. 8B-8D respectively illustrates the R region, the R1 region and the R2 region in the pixel structure 21 of FIG. 8A. Referring FIG. 8A to FIG. 8D together, the first main pixel electrode 100 has a plurality of first main pixel strip electrodes 104 and a plurality of first main pixel slits 102, which a line width of the first main pixel strip electrodes 104 is L, and a width of the first main pixel slits 102 is S (as shown in FIG. 8B); and the first sub-pixel electrode 120 has the first electrode pattern 120a and the second electrode pattern 120b. In the embodiment, the first electrode pattern 120a has a plurality of first strip electrodes 114 and a plurality of first slits 112, which a line width of the first strip electrode 114 is L1 and a width of the first slits is S1 (as shown in FIG. 8C), where each of the width S1 of the first slits 112 is greater than the width S of the first main pixel slits 102; and the second electrode pattern 110b has a plurality of second strip electrodes 124 and a plurality of second slits 122, which a line width of the second strip electrode 124 is L2 and a width of the second slits 122 is S2 (as shown in FIG. 8D), where each of the width S2 of the second slits 122 is less than the width S of the first main pixel slits 102. However, the invention is not limited thereto. In one embodiment, the width S1 of the first slits 112 is, for example, greater than the width S of the first main pixel slits 102, and the width S2 of the second slits 122 is, for example, equal to the width S of the first main pixel slits 102. In other embodiments, the width S1 of the first slits 112 is, for example, equal to the width S of the first main pixel slits 102, and the width S2 of the second slits 122 is, for example, less than the width S of the first main pixel slits 102. Besides, the width S2 of the second slit 122 is not equal to the width S1 of the first slits 112.

The first electrode pattern 120a is connected to the second electrode pattern 120b, and the first electrode pattern 120a and the second electrode pattern 120b share the same driving voltage. The first main pixel electrode 100 has a main line width/slit width ratio (L/S), the first electrode pattern 120a of the first sub-pixel electrode 120 has a first line width/slit width ratio (L1/S1), the second electrode pattern 120b of the first sub-pixel electrode 120 has a second line width/slit width ratio (L2/S2), and the main line width/slit width ratio (L/S) of the first main pixel electrode 100 is greater than the first line width/slit width ratio (L1/S1) of the first electrode pattern 110a. In one embodiment, the main line width L of the first main pixel electrode 100 is equal to the first line width L1 of the first electrode pattern 120a. In one embodiment, the main line width/slit width ratio (L/S) is, for example, (4/2); the first line width/slit width ratio (L1/S1) is, for example, (4/4); and the second line width/slit width ratio (L2/S2) is, for example, (4/2). However, the invention is not limited thereto. An area of the second electrode pattern 120b is about 5% to 80% of an area of the first sub-pixel electrode 120. In the present embodiment, the first electrode pattern 120a is located at the center of the first sub-pixel electrode 120, and the second electrode pattern 120b is located on two opposite sides of the first electrode pattern 120a. However, in other embodiments, the second electrode pattern 120b is located at the center of the first sub-pixel electrode 120, and the first electrode pattern 120a is located on two opposite sides of the second electrode pattern 120b.

Accordingly, compared to the design of a conventional pixel array, the design having the width S1 of the first slits 112 of the first electrode pattern 120a of the first sub-pixel electrode 120 being greater than the width S of the first main pixel slits 102 of the first main pixel electrode 100 is employed in the first pixel structure 21 of the pixel array PX2 of the present embodiment, such that the first electrode pattern 120a of the first sub-pixel electrode 120 has a larger threshold voltage, thereby suppressing the phenomenon of yellow-bias at a high gray level. At the same time, by employing the design having the width S2 of the second slits 122 of the second electrode pattern 120b of the first sub-pixel electrode 120 being less than the width S of the first main pixel slits 102, such that the second electrode pattern 120b of the first sub-pixel electrode 120 has a smaller threshold voltage, thereby suppressing the phenomenon of yellow-bias and/or green-bias at a middle gray level. Therefore, the pixel array of the present embodiment is capable of mitigating the problem of color shift in a side view image, as compared to the conventional pixel array.

Figure 9:
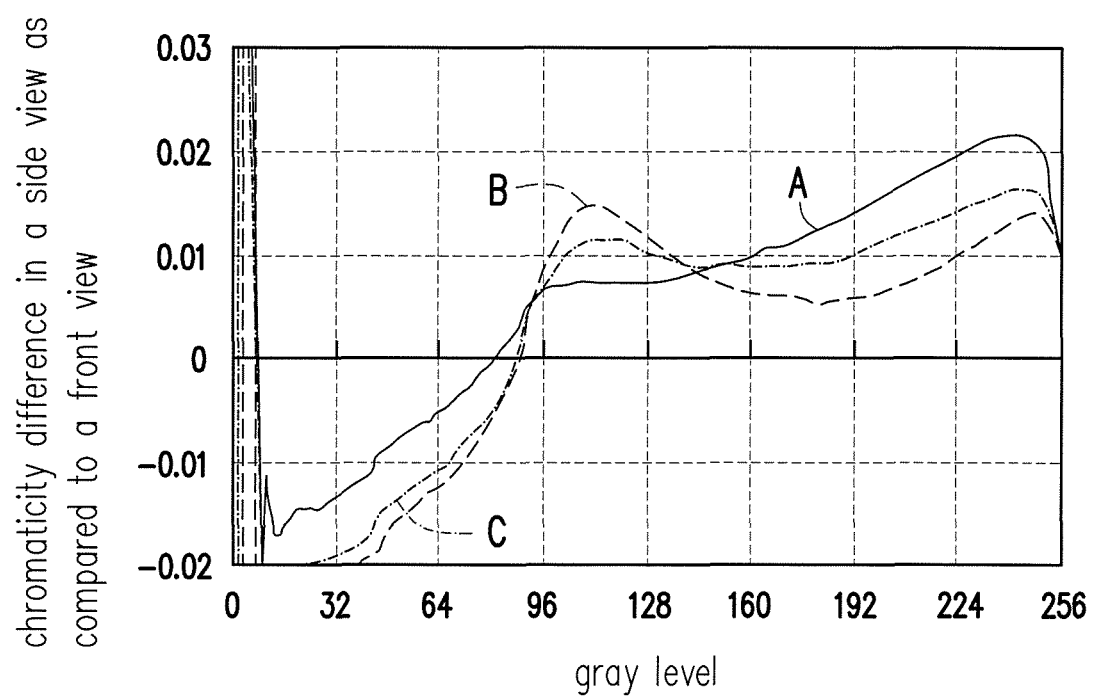
FIG. 9 is a graph showing the relationship between the gray level and chromaticity difference (e.g., a side view as compared to a front view) of a liquid crystal display panel having the pixel array of FIG. 8A.

FIG. 9 is a graph showing the relationship between the gray level and chromaticity difference (e.g., a side view as compared to a front view image) of the liquid crystal display panel of FIG. 8A. In FIG. 9, a curve A denotes a gray-level and chromaticity difference (e.g., a side view as compared to a front view image) relationship obtained from viewing a LCD having the conventional pixel array at a 45° viewing angle, in which a line width/slit width ratio of the main pixel electrode and a line width/slit width ratio of the sub-pixel electrode of the blue, green and red pixel structures are the same (e.g., 4/2). A curve B denotes a gray-level and chromaticity difference (e.g., a side view as compared to a front view image) relationship obtained from viewing a LCD having the conventional pixel array at a 45° viewing angle, in which a line width/slit width ratio of the main pixel electrode of the blue, green and red pixel structures are the same (e.g., 4/2), a line width/slit width ratio of the sub-pixel electrode of the green and red pixel structures are the same (e.g., 4/4), and a line width/slit width ratio of the sub-pixel electrode of the blue pixel structure is, for example, 4/4. For clarification, the blue, green and red pixel structures of the aforementioned conventional pixel arrays are employed the same pixel structure; for a instance, the aforementioned conventional pixel arrays are composed of the second pixel structure 22 or the third pixel structure 23 of the pixel array PX2 of FIG. 8A. A curve C denotes a gray-level and chromaticity difference (e.g., a side view as compared to a front view image) relationship obtained from viewing a LCD having the pixel array PX2 of FIG. 8A at a 45° viewing angle. According to FIG. 9, in case of a large viewing angle (side view), compared to a front view image, a side view image of the LCDs having the conventional pixel still goes greenish or yellowish at a mid gray level and goes yellowish at a high gray level. However, when the LCD is employed the pixel array PX2 of FIG. 8A, the chromaticity difference problem (e.g., green-bias or yellow-bias at a mid gray level and yellow-bias at a high gray level) of a side view image is certainly being mitigated.

Figure 10A:
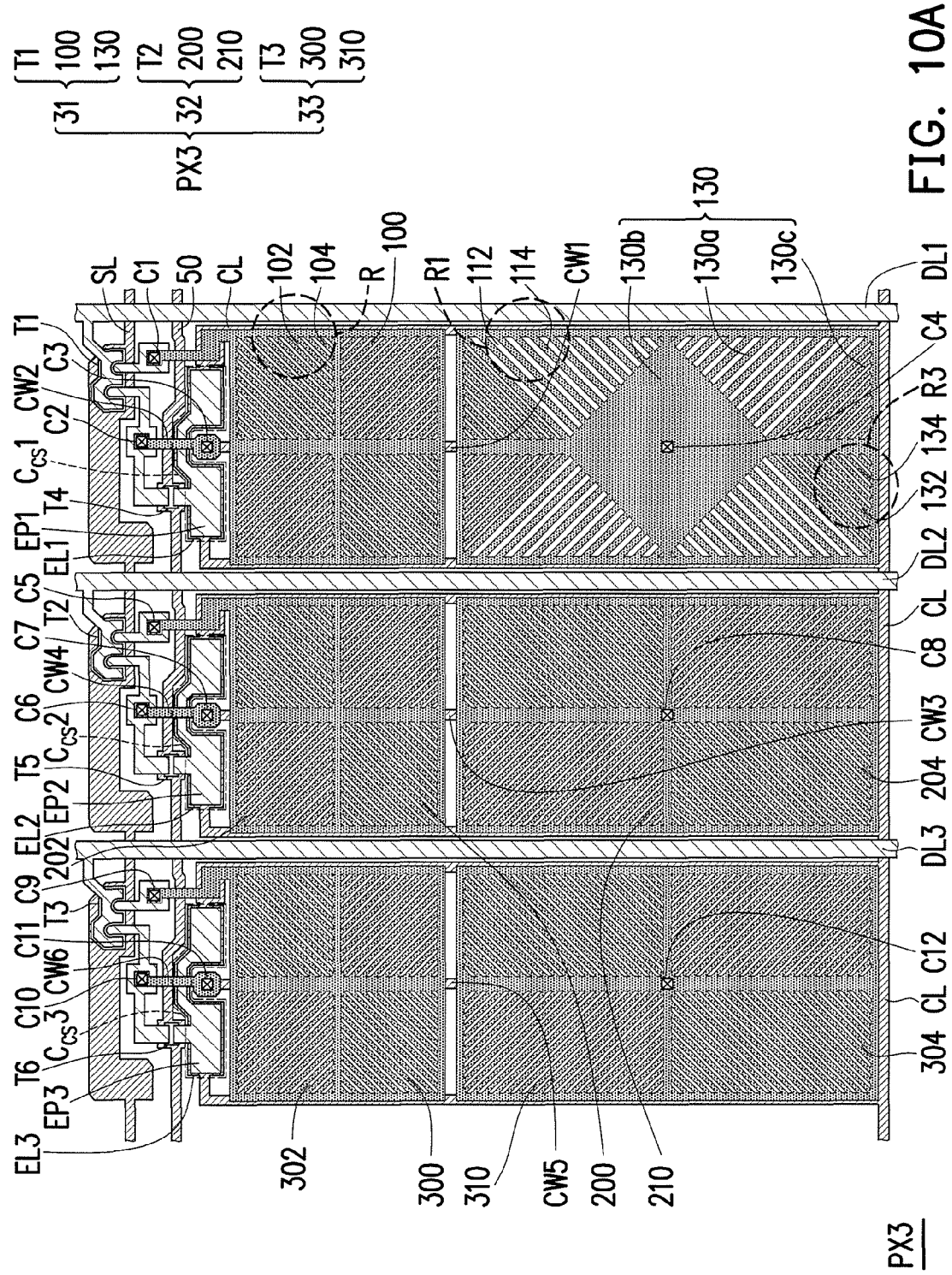
FIG. 10A is a schematic top view illustrating an embodiment of a pixel array having the pixel structure of FIG. 5A.

FIG. 10A is a schematic top view illustrating an embodiment of a pixel array having the pixel structure of FIG. 5A. The pixel array PX3 of the present embodiment is similar to the pixel array PX1 of FIG. 6A. Specifically, the first pixel structure 31 of FIG. 10A is similar to the pixel structure 31 of FIG. 5A, the second pixel structure 32 of FIG. 10A is similar to the second pixel structure 12 of FIG. 6A, and the third pixel structure 33 of FIG. 10A is similar to the third pixel structure 13 of FIG. 6A. Accordingly, the same or similar devices are represented by the same or similar symbols, and details thereof are no repeated. Please refer to the above detailed descriptions of FIG. 6A and FIGS. 6D~6G for the details of the second pixel structure 32 and the third pixel structure 33 of FIG. 10A. In the present embodiment, the first pixel structure 31 is a blue pixel structure; and the second pixel structure 32 and the third pixel structure 33 are, for example, a green pixel structure and a red pixel structure, respectively.

Referring to FIG. 10A, the pixel array PX3 of the present embodiment includes a first pixel structure 31, a second pixel structure 32, and a third pixel structure 33. The first pixel structure 31 includes a first control device T1, a first main pixel electrode 100, and a first sub-pixel electrode 130. The second pixel structure 32 includes a second control device T2, a second main pixel electrode 200, and a second sub-pixel electrode 210. The third pixel structure 33 includes a third control device T3, a third main pixel electrode 300, and a third sub-pixel electrode 310. Referring to FIG. 10A, the first pixel structure 31 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4; the second pixel structure 32 further includes: a scan line SL, a data line DL2, a signal line 50, a sharing switch device T5, wirings CW3~CW4, a common line CL, a sharing capacitor $C_{cs}2$, a lower electrode EL2, a upper electrode EP2, and contact windows C5~C8; and the third pixel structure 33 further includes: a scan line SL, a data line DL3, a signal line 50, a sharing switch device T6, wirings CW5~CW6, a common line CL, a sharing capacitor $C_{cs}3$, a lower electrode EL3, a upper electrode EP3, and contact windows C9~C12.

Here, the common line CL is coupled to the first main pixel electrode 100/the first sub-pixel electrode 130, second main pixel electrode 200/the second sub-pixel electrode 210, and third main pixel electrode 300/the third sub-pixel electrode 310 to form storage capacitors (not marked). The first main pixel electrode 100 and the first sub-pixel electrode 130 have different driving voltages, the second main pixel electrode 200 and the second sub-pixel electrode 210 have different driving voltages, and the third main pixel electrode 300 and the third sub-pixel electrode 310 have different driving voltages.

Figure 10B:
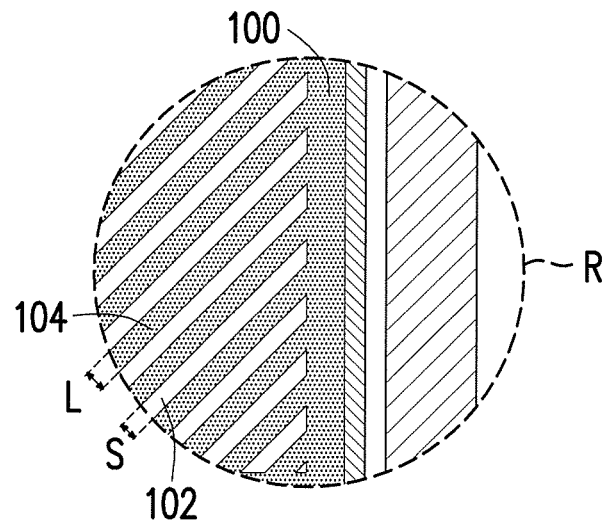
FIGS. 10B-10D are schematic partial views illustrating the pixel structures depicted FIG. 10A.
Figure 10C:
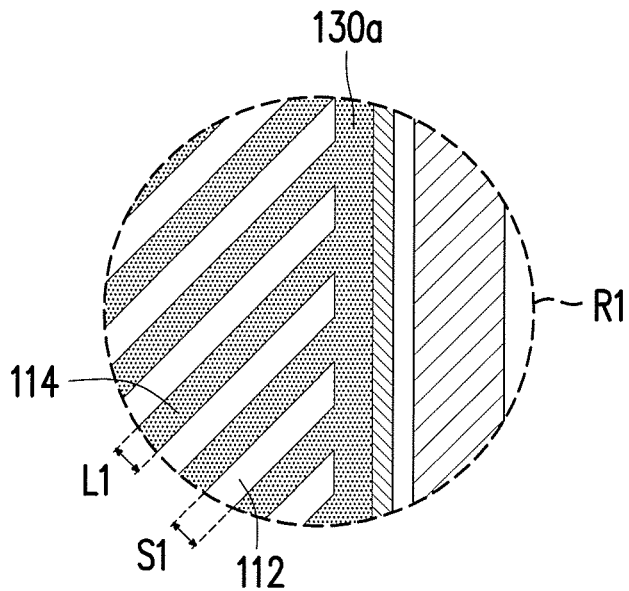
Figure 10D:
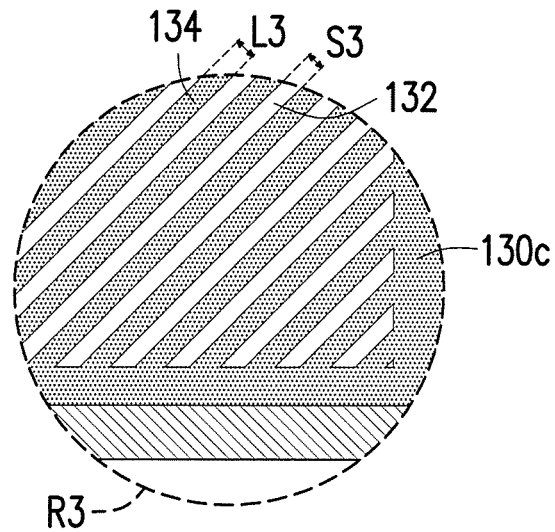

FIGS. 10B-10D are schematic partial views illustrating the pixel structure depicted FIG. 10A, in which FIG. 10B-10D respectively illustrates the R region, the R1 region and the R3 region in the pixel structure 31 of FIG. 10A. The R region is a partial enlarged view of the first main pixel electrode 100, the R1 region is a partial enlarge view of the first electrode pattern 130a of the first sub-pixel electrode 130, and the R3 region is a partial enlarge view of the third electrode pattern 130c of the first sub-pixel electrode 130. Referring FIG. 10A to FIG. 10D together, the first main pixel electrode 100 has a plurality of first main pixel strip electrodes 104 and a plurality of first main pixel slits 102, which a line width of the first main pixel strip electrodes 104 is L, and a width of the first main pixel slits 102 is S (as shown in FIG. 10B); and the first sub-pixel electrode 130 has the first electrode pattern 130a, the second electrode pattern 130b and the third electrode pattern 130c. In the present embodiment, the first electrode pattern 130a has a plurality of first strip electrodes 114 and a plurality of first slits 112, which a line width of the first strip electrode 114 is L1 and a width of the first slits 112 is S1 (as shown in FIG. 10C), where each of the width S1 of the first slits 112 is greater than the width S of the first main pixel slits 102; the second electrode pattern 130b has no slits; and the third electrode pattern 130c has a plurality of third strip electrodes 134 and a plurality of third slits 132, which a line width of the third strip electrodes 134 is L3 and a width of the third slits 132 is S3 (as shown in FIG. 10D), where each of the width S3 of the third slits 132 is equal to the width S of the first main pixel slits 102. However, the invention is not limited thereto. In one embodiment, each of the width S1 of the first slits 112 is greater than the width S of the first main pixel slits 102, the second electrode pattern 110b has no slits, and each of the width S3 of the third slits 132 is less than the width S of the first main pixel slits 102. In one embodiment, each of the width S1 of the first slits 112 is equal to the width S of the first main pixel slits 102, the second electrode pattern 110b has no slits, and each of the width S3 of the third slits 132 is less than the width S of the first main pixel slits 102. In other words, each of the width S1 of the first slits 112 is equal to or greater than the width S of the first main pixel slits 102; the second electrode pattern 130b has no slits; and each of the width S3 of the third slits 132 is less than the width S1 of the first slits 112 and is less than or equal to the width S of the first main pixel slits 102.

The first electrode pattern 130a is connected to the second electrode pattern 130b and the third electrode pattern 130c, and the first electrode pattern 120a, the second electrode pattern 130b and the third electrode pattern 130c share the same driving voltage. The first main pixel electrode 100 has a main line width/slit width ratio (L/S), the first electrode pattern 130a of the first sub-pixel electrode 130 has a first line width/slit width ratio (L1/S1), the third electrode pattern 130c of the first sub-pixel electrode 130 has a third line width/slit width ratio (L3/S3), and the main line width/slit width ratio (L/S) of the first main pixel electrode 100 is greater than the first line width/slit width ratio (L1/S1) of the first electrode pattern 130a. In one embodiment, the main line width L of the first main pixel electrode 100 is equal to the first line width L1 of the first electrode pattern 130a. In the present embodiment, the main line width/slit width (L/S) of the first main pixel electrode 100 is, for example, (4/2), the first line width/slit width ratio (L1/S1) of the first electrode pattern 130a is, for example, (4/4), and the third line width/slit width (L3/S3) of the third electrode pattern 130c is, for example, (4/2). However, the invention is not limited thereto. An area of the second electrode pattern 130b is about 5% to 80% of an area of the first sub-pixel electrode 130. The second electrode pattern 130b is located at the center of the first sub-pixel electrode 130, the first electrode pattern 130a is located on two opposite sides of the second electrode pattern 130b, and the third electrode pattern 130c is located on other two opposite sides of the second electrode pattern 130b.

Accordingly, compared to the design of a conventional pixel structure, the design having the width S1 of the first slits 112 of the first electrode pattern 130a of the first sub-pixel electrode 130 being greater than the width S of the first main pixel slits 102 is employed in the pixel structure 31 of the pixel array PX3 of the present embodiment, such that the first electrode pattern 130a of the first sub-pixel electrode 130 has a larger threshold voltage, thereby suppressing the phenomenon of yellow-bias at a high gray level. Also, by employing the design of the second electrode pattern 130b of the first sub-pixel electrode 130 having no slits and the width S3 of the third slits 132 of the first sub-pixel electrode 130 of the first sub-pixel electrode 130 being less than the width S of the first main pixel slits 102, such that the second electrode pattern 130b and the third electrode pattern 130c of the first sub-pixel electrode 130 have a smaller threshold voltage, thereby further suppressing the phenomenon of yellow-bias and/or green-bias at a middle gray level. Therefore, the pixel array of the present embodiment is capable of mitigating the problem of color shift in a side view image, as compared to the conventional pixel array.

Figure 11:
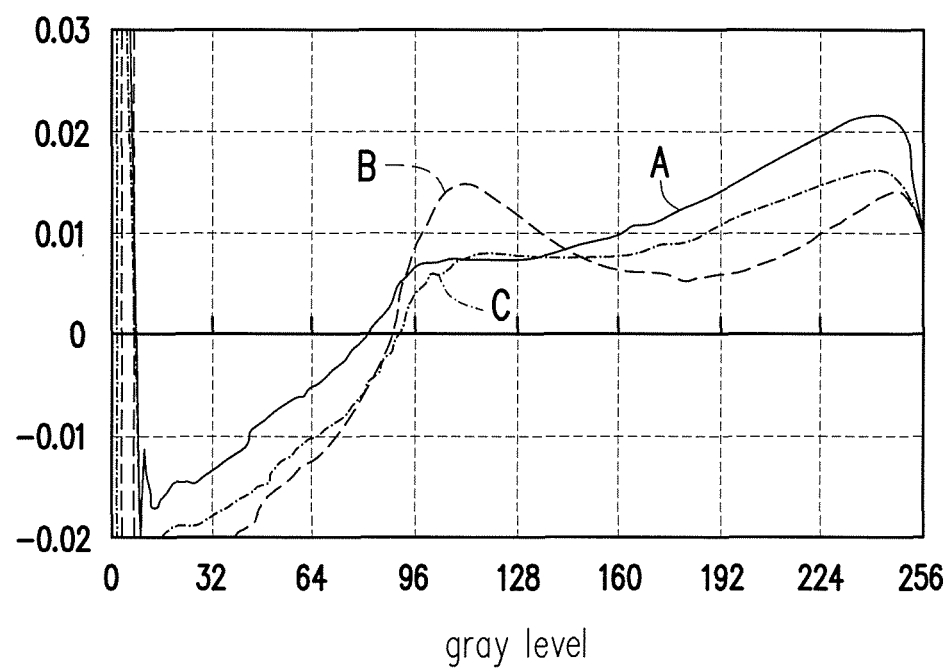
FIG. 11 is a graph showing the relationship between the gray level and chromaticity difference (e.g., a side view as compared to a front view) of a liquid crystal display panel having the pixel array of FIG. 10A.

FIG. 11 is a graph showing the relationship between the gray level and chromaticity difference (e.g., a side view as compared to a front view image) of the liquid crystal display panel of FIG. 10A. In FIG. 11, a curve A denotes a gray-level and chromaticity difference (e.g., a side view as compared to a front view image) relationship obtained from viewing a LCD having the conventional pixel array at a 45° viewing angle, in which a line width/slit width ratio of the main pixel electrode and a line width/slit width ratio of the sub-pixel electrode of the blue, green and red pixel structures are the same (e.g., 4/2). A curve B denotes a gray-level and chromaticity difference (e.g., a side view as compared to a front view image) relationship obtained from viewing a LCD having the conventional pixel array at a 45° viewing angle, in which a line width/slit width ratio of the main pixel electrode of the blue, green and red pixel structures are the same (e.g., 4/2), a line width/slit width ratio of the sub-pixel electrode of the green and red pixel structures are the same (e.g., 4/2), and a line width/slit width ratio of the sub-pixel electrode of the blue pixel structure is, for example, 4/4. For clarification, the blue, green and red pixel structures of the aforementioned conventional pixel arrays are employed the same pixel structure; for a instance, the aforementioned conventional pixel arrays are composed of the second pixel structure 32 or the third pixel structure 33 of the pixel array PX3 of FIG. 10A. A curve C denotes a gray-level and chromaticity difference (e.g., a side view as compared to a front view image) relationship obtained from viewing a LCD having the pixel array PX3 of FIG. 10A at a 45° viewing angle. According to FIG. 11, in case of a large viewing angle (side view), compared to a front view image, a side view image of the LCDs having the conventional pixel still goes greenish or yellowish at a mid gray level and goes yellowish at a high gray level. However, when the LCD is employed the pixel array PX3 of FIG. 10A, the chromaticity difference problem (e.g., green-bias or yellow-bias at a mid gray level and yellow-bias at a high gray level) of a side view image is certainly being mitigated.

Figure 12:
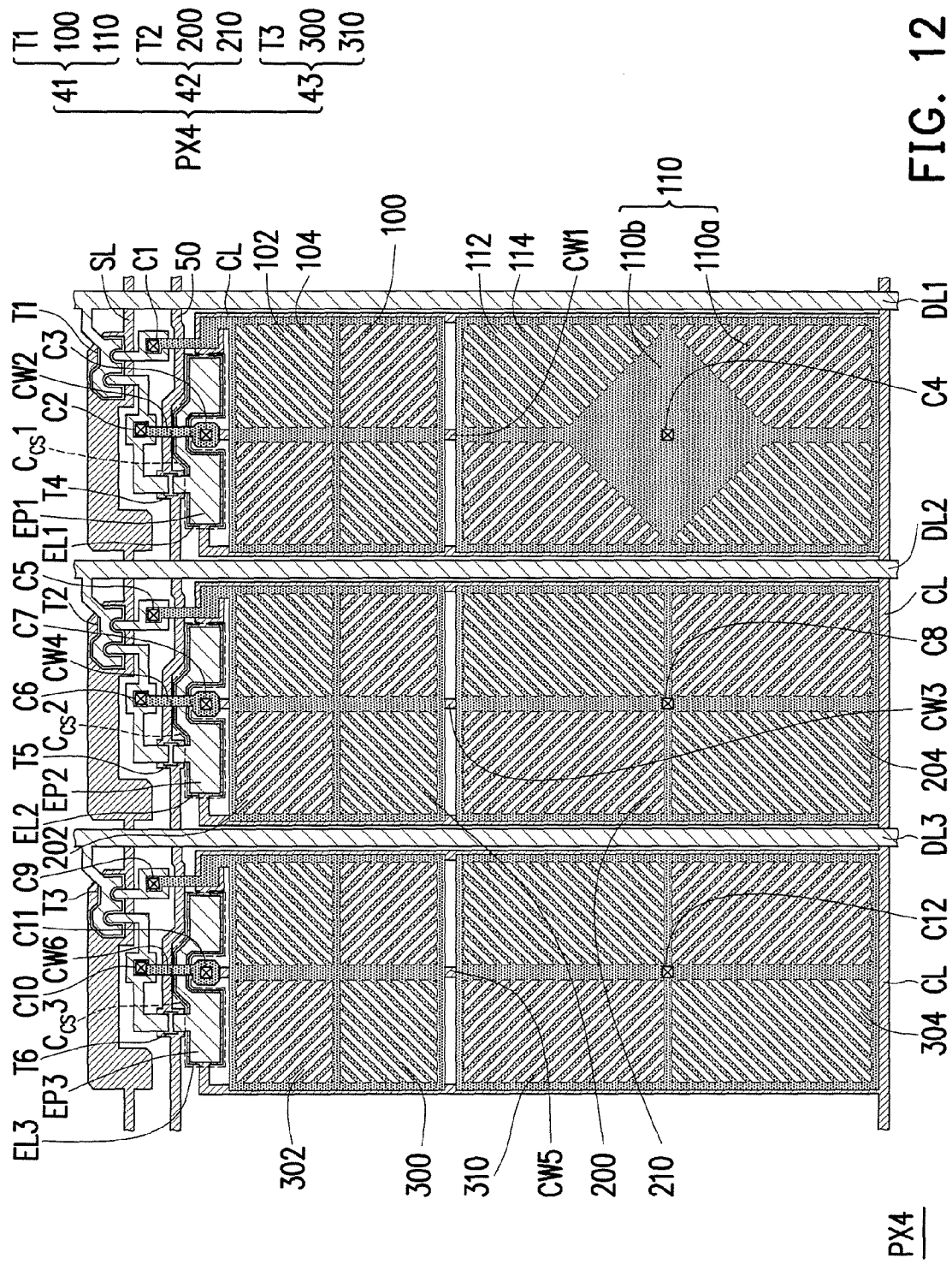
FIG. 12 is a schematic top view illustrating another embodiment of a pixel array having the pixel structure of FIG. 1A.

FIG. 12 is a schematic top view illustrating another embodiment of a pixel array having the pixel structure of FIG. 1A. The pixel array PX4 of the present embodiment is similar to the pixel array PX1 of FIG. 6A, thus the same or similar devices are represented by the same or similar symbols, and details thereof are no repeated. Specifically, the first pixel structure 41, the second pixel structure 42 and the third pixel structure 43 of FIG. 12 is as same as the first pixel structure 11, the second pixel structure 12 and the third pixel structure 13 of FIG. 6A, respectively; and therefore, please refer to the above detailed descriptions of FIG. 6A~6G for the details of the first pixel structure 41, the second pixel structure 42 and the third pixel structure 43 of FIG. 12.

Referring to FIG. 12, the pixel array PX4 of the present embodiment includes a first pixel structure 41, a second pixel structure 42, and a third pixel structure 43. The first pixel structure 41 includes a first control device T1, a first main pixel electrode 100, and a first sub-pixel electrode 110. The second pixel structure 42 includes a second control device T2, a second main pixel electrode 200, and a second sub-pixel electrode 210. The third pixel structure 43 includes a third control device T3, a third main pixel electrode 300, and a third sub-pixel electrode 310. Referring to FIG. 12, the first pixel structure 41 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4; the second pixel structure 42 further includes: a scan line SL, a data line DL2, a signal line 50, a sharing switch device T5, wirings CW3~CW4, a common line CL, a sharing capacitor $C_{cs}2$, a lower electrode EL2, a upper electrode EP2, and contact windows C5~C8; and the third pixel structure 43 further includes: a scan line SL, a data line DL3, a signal line 50, a sharing switch device T6, wirings CW5~CW6, a common line CL, a sharing capacitor $C_{cs}3$, a lower electrode EL3, a upper electrode EP3, and contact windows C9~C12.

The common line CL is coupled to the first main pixel electrode 100/the first sub-pixel electrode 110, the second main pixel electrode 200/the second sub-pixel electrode 210, and the third main pixel electrode 300/the third sub-pixel electrode 310 to form storage capacitors (not marked). The first main pixel electrode 100 and the first sub-pixel electrode 110 have different driving voltages, the second main pixel electrode 200 and the second sub-pixel electrode 210 have different driving voltages, and the third main pixel electrode 300 and the third sub-pixel electrode 310 have different driving voltages.

The pixel array PX4 of the present embodiment is similar to the pixel array PX1 of FIG. 6A, and a difference between the pixel array PX4 and the pixel array PX1 is that, in the pixel array PX4, the main line width/slit width ratio (L/S) of the first main pixel electrode 100 is, for example, (5/3), and the first line width/slit width ratio (L1/S1) of the first electrode pattern 110a is, for example, (5/3). Besides, the second main pixel electrode 200, the second sub-pixel electrode 210, the third main pixel electrode 300, and the third sub-pixel electrode 310 have a line width/slit width ratio as same as the main line width/slit width ratio (L/S) of the first main pixel electrode 100. In present embodiment, the first pixel structure 41 is a blue pixel structure; and the second pixel structure 42 and the third pixel structure 43 are, for example, a green pixel structure and a red pixel structure, respectively.

Accordingly, compared to the design of a conventional pixel array, the design of the second electrode pattern 110b of the first sub-pixel electrode 110 having no slits is employed in the first pixel structure 41 of the pixel array PX4 of the present embodiment, such that the second electrode pattern 110b of the first sub-pixel electrode 110 has a smaller threshold voltage, thereby suppressing the phenomenon of yellow-bias and/or green-bias at a middle gray level. Therefore, the pixel array of the present embodiment is capable of mitigating the problem of color shift in a side view image, as compared to the conventional pixel array.

Figure 13:
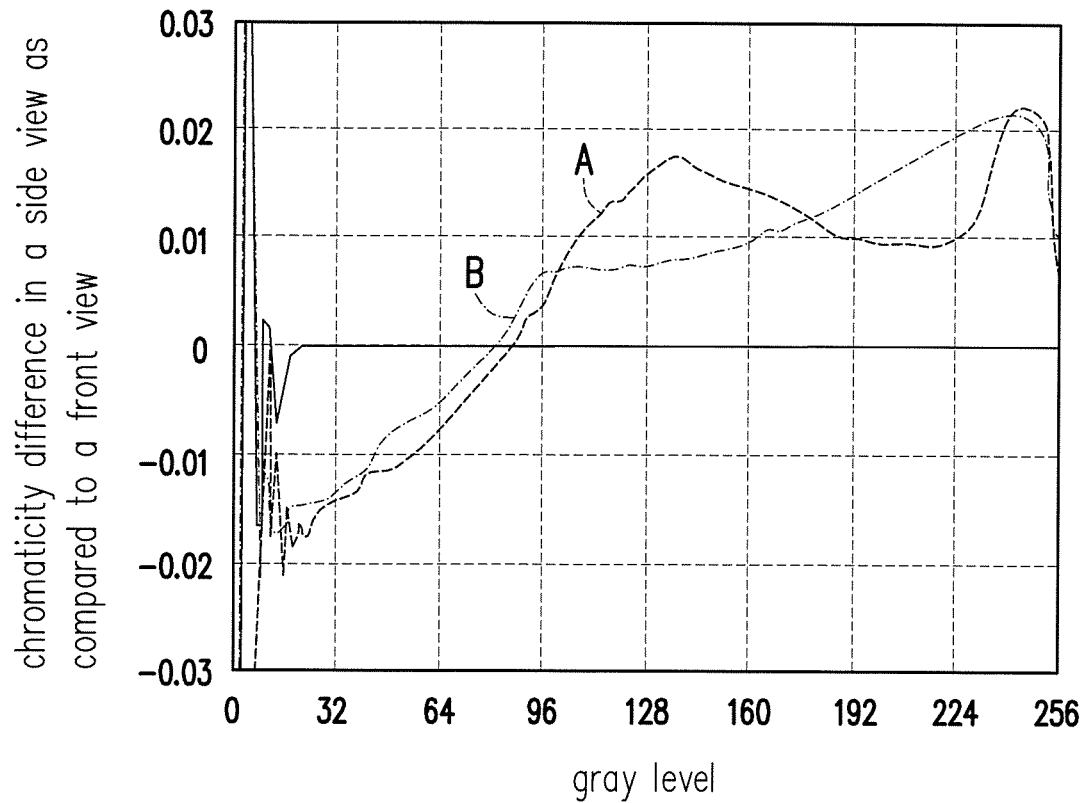
FIG. 13 is a graph showing the relationship between the gray level and chromaticity difference (e.g., a side view as compared to a front view) of a liquid crystal display panel having the pixel array of FIG. 12.

FIG. 13 is a graph showing the relationship between the gray level and chromaticity difference (e.g., a side view as compared to a front view) of a liquid crystal display panel having the pixel array of FIG. 12. In FIG. 13, a curve A denotes a gray-level and chromaticity difference (e.g., a side view as compared to a front view image) relationship obtained from viewing a LCD having the conventional pixel array at a 45° viewing angle, in which a line width/slit width ratio of the main pixel electrode and a line width/slit width ratio of the sub-pixel electrode of each of blue, green and red pixel structures are the same (e.g., 4/2). For clarification, the blue, green and red pixel structures of the aforementioned conventional pixel array share the same pixel structure. A curve B denotes a gray-level and chromaticity difference (e.g., a side view as compared to a front view image) relationship obtained from viewing a LCD having the pixel array PX4 of FIG. 12 at a 45° viewing angle. According to FIG. 13, in case of a large viewing angle (side view), compared to a front view image, a side view image of the LCDs having the conventional pixel array still goes greenish or yellowish at a mid gray level and goes yellowish at a high gray level. However, with the LCD having the pixel array PX4 of FIG. 12, the chromaticity difference problem (e.g., green-bias or yellow-bias at a mid gray level) of a side view image is certainly being mitigated.

Figure 14A:
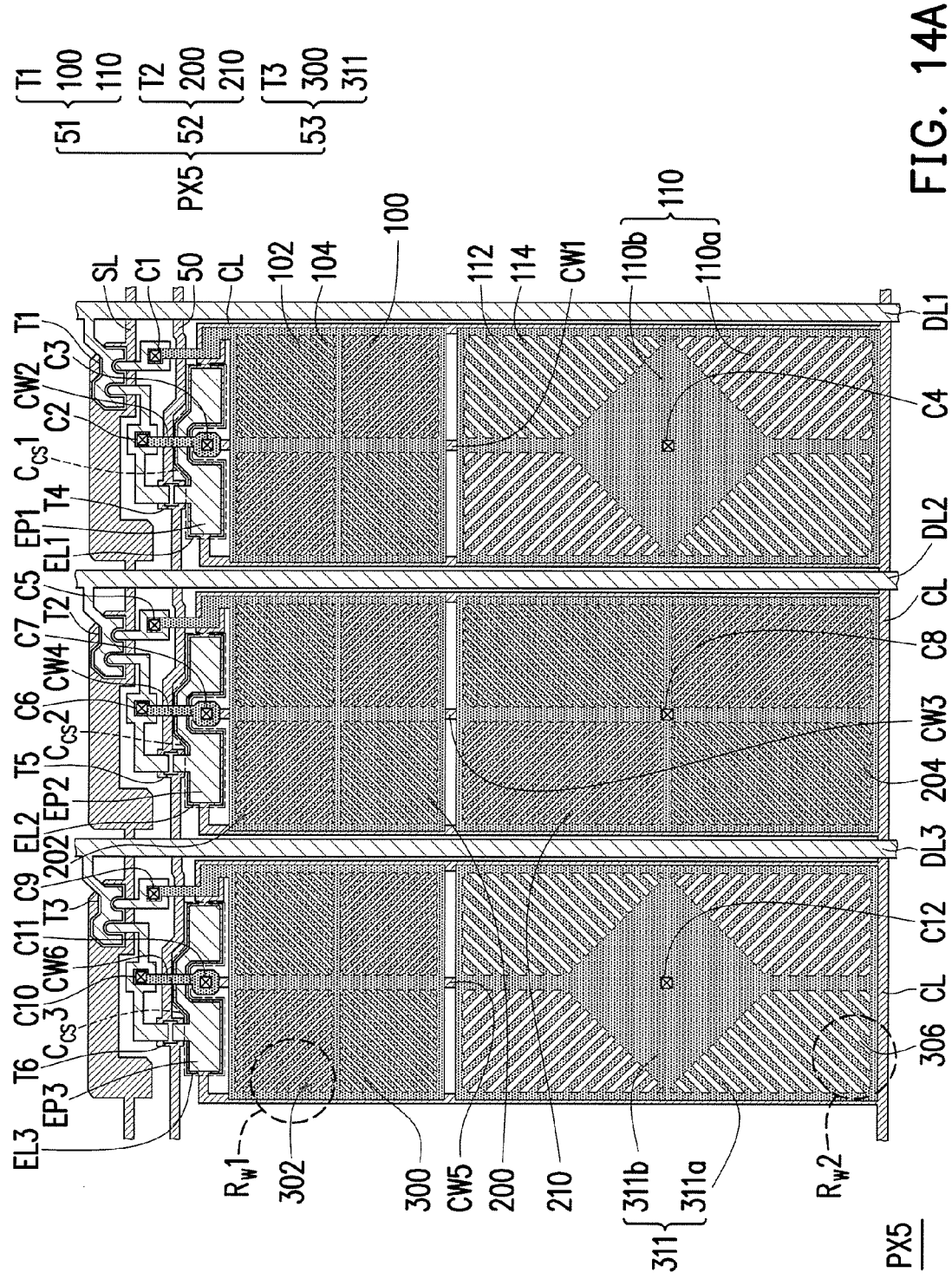
FIG. 14A is a schematic top view illustrating another embodiment of a pixel array according to the invention.

FIG. 14A is a schematic top view illustrating a pixel array according to another embodiment of the invention. The pixel array PX5 of the present embodiment is similar to the pixel array PX1 of FIG. 6A, thus the same or similar devices are represented by the same or similar symbols, and details thereof are no repeated. Specifically, the first pixel structure 51 and the second pixel structure 52 of FIG. 14A is as same as the first pixel structure 11 and the second pixel structure 12 of FIG. 6A, respectively; and therefore, please refer to the above detailed descriptions of FIG. 6A~6E for the details of the first pixel structure 51 and the second pixel structure 52 of FIG. 14A.

Referring to FIG. 14A, a pixel array PX5 of the present embodiment includes a first pixel structure 51, a second pixel structure 52, and a third pixel structure 53. The first pixel structure 51 includes a first control device T1, a first main pixel electrode 100, and a first sub-pixel electrode 110. The second pixel structure 52 includes a second control device T2, a second main pixel electrode 200, and a second sub-pixel electrode 210. The third pixel structure 53 includes a third control device T3, a third main pixel electrode 300, and a third sub-pixel electrode 311. Referring to FIG. 14A, the first pixel structure 51 further includes: a scan line SL, a data line DL1, a signal line 50, a sharing switch device T4, wirings CW1~CW2, a common line CL, a sharing capacitor $C_{cs}1$, a lower electrode EL1, a upper electrode EP1, and contact windows C1~C4; the second pixel structure 52 further includes: a scan line SL, a data line DL2, a signal line 50, a sharing switch device T5, wirings CW3~CW4, a common line CL, a sharing capacitor $C_{cs}2$, a lower electrode EL2, a upper electrode EP2, and contact windows C5~C8; and the third pixel structure 53 further includes: a scan line SL, a data line DL3, a signal line 50, a sharing switch device T6, wirings CW5~CW6, a common line CL, a sharing capacitor $C_{cs}3$, a lower electrode EL3, a upper electrode EP3, and contact windows C9~C12.

Here, the common line CL is coupled to the first main pixel electrode 100/the first sub-pixel electrode 110, second main pixel electrode 200/the second sub-pixel electrode 210, and third main pixel electrode 300/the third sub-pixel electrode 311 to form storage capacitors (not marked). The first main pixel electrode 100 and the first sub-pixel electrode 110 have different driving voltages, the second main pixel electrode 200 and the second sub-pixel electrode 210 have different driving voltages, and the third main pixel electrode 300 and the third sub-pixel electrode 311 have different driving voltages.

The pixel array PX5 of the present embodiment is similar to the pixel array PX1 of FIG. 6A, and a difference between the pixel array PX5 and the pixel array PX1 is that, the third pixel structure 53 of the pixel array PX5 is as same as the first pixel structure 11 of FIG. 6A.

Figure 14B:
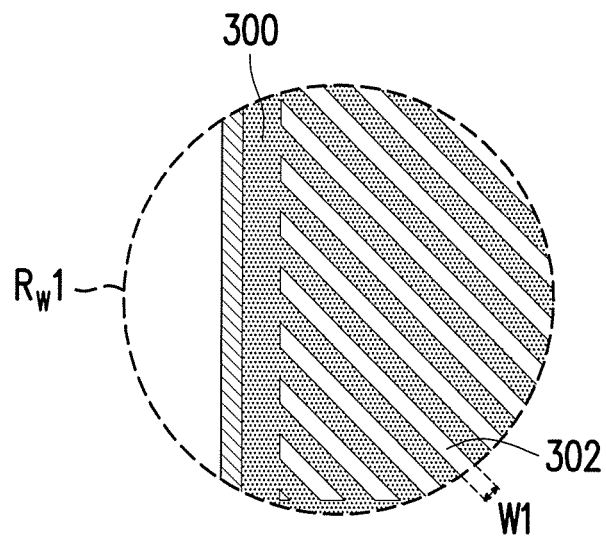
FIGS. 14B-14C are schematic partial views illustrating the pixel structures depicted FIG. 14A.
Figure 14C:
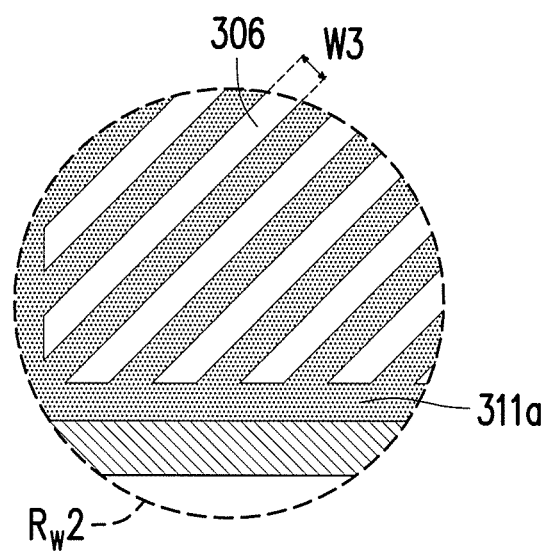

FIGS. 14B-14C are schematic partial views illustrating the pixel structure depicted FIG. 14A, in which FIGS. 14B-14C respectively illustrates the $R_{W}1$ region and the $R_{W}3$ region in the third pixel structures 53 of FIG. 14A. The $R_{W}1$ region in FIG. 14B is a partial enlarged view of the third main pixel electrode 300 of the third pixel structures 53, and the $R_{W}2$ region in FIG. 14C is a partial enlarge view of the third sub-pixel electrode 311. Referring FIG. 14A to FIG. 14C together, the third pixel structure 53 includes the third main pixel electrode 300 and the third sub-pixel electrode 311. The third main pixel electrode 300 has a plurality of third main pixel strip electrodes (not marked) and a plurality of third main pixel slits 302, which a width of the third main pixel slits 302 is W1 (as shown in FIG. 14B. The third sub-pixel electrode 311 has a four electrode pattern 311a and a fifth electrode pattern 311b. In the present embodiment, the fourth electrode pattern 311a has a plurality of fourth strip electrodes (not marked) and a plurality of fourth slits 306, which a width of the fourth slits 306 is W3 (as shown in FIG. 14C), where each of the width W3 of the fourth slits 306 is greater than the width W1 of the third main pixel slits 302; and the fifth electrode pattern 311b has no slits. However, the invention is not limited thereto. In one embodiment, the width W3 of the fourth slits 306 is, for example, equal to the width W1 of the third main pixel slits 302, and the fifth electrode pattern 311b, for example, has no slits. The fourth electrode pattern 311a is connected to fifth electrode pattern 311b, and the fourth electrode pattern 311a and the fifth electrode pattern 311b share the same driving voltage. By this, in the present embodiment, the first pixel structure 51 is a blue pixel structure, the second pixel structure 52 is, for example, a green pixel structure, and the third pixel structure 13 is, for example, a red pixel structure.

In the present embodiment, the first pixel structure 51 and the third pixel structure 53 of the pixel array PX5 is similar to the first pixel structure 11 of the pixel array PX1 of FIG. 6A; however, the invention is not limited thereto. In other embodiments, the first pixel structure 51 and the third pixel structure 53 of the pixel array PX5 may be, together or individually, replaced with the first pixel structure 21 of FIG. 8A or the first pixel structure 31 of FIG. 10A. Namely, in one embodiment, the first pixel structure 51 and the third pixel structure 53 of the pixel array PX5 have the same pixel structure or different pixel structures.

As an example, in one embodiment (not illustrated), the third pixel structure 53 of the pixel array PX5 may be replaced with the first pixel structure 21 of FIG. 8A, such that the third pixel structure 53 of the pixel array PX5 has the fourth electrode pattern and the fifth pixel pattern. Specifically, the fourth electrode pattern has a plurality of fourth strip electrodes and a plurality of fourth slits (not illustrated), where a width W3 of each fourth slit is, for example, equal to or greater than a width W1 of each third main pixel slit; and the fifth electrode pattern has a plurality of fifth strip electrodes and a plurality of fifth slits (not illustrated), where a width W4 of each fifth slit is, for example, less than or equal to a width W1 of each third main pixel slit. Furthermore, the width W4 of each fifth slit is not equal to the width W3 of each fourth slit.

As described above, compared to the design of a conventional pixel array, the design having the width S1 of the first slits 112 of the first electrode pattern 110a of the first sub-pixel electrode 110 being greater than the width S of the main pixel slits 102 is employed in the first pixel structure 51 and the third pixel structure 53 of the present embodiment, and the width W3 of the fourth slit 306 of the fourth electrode pattern 311a of the third sub-pixel electrode 311 is greater than the width W1 of the third main pixel slit 302, such that the first electrode pattern 110a of the first sub-pixel electrode 110 and the fourth electrode pattern 311a of the third sub-pixel electrode 311 have a larger threshold voltage, thereby suppressing the phenomenon of yellow-bias at a high gray level. At the same time, by employing the design of the second electrode pattern 110b of the first sub-pixel electrode 110 having no slits and the fifth electrode pattern 311b of the third sub-pixel electrode 311 having no slits, the second electrode pattern 110b of the first sub-pixel electrode 110 and the fifth electrode pattern 311b of the third sub-pixel electrode 311 have a smaller threshold voltage, thereby suppressing the phenomenon of red-bias and/or green-bias at a middle gray level. Therefore, the pixel array of the present embodiment is capable of mitigating the problem of color shift in a side view image, as compared to the conventional pixel array.

In light of foregoing, the pixel electrode of the pixel structure is divided as the main pixel electrode and the sub-pixel electrode separated from the main pixel electrode, which the sub-pixel electrode at least includes the first electrode pattern and the second electrode pattern. In the invention, by adjusting the slit widths of the pixel electrode (e.g., the main pixel electrode, the first electrode pattern of the sub-pixel electrode, and the second electrode pattern of the sub-pixel electrode), the first electrode pattern and the second electrode pattern of the sub-pixel electrode obtain an electrical field of different strength, respectively, such that the first electrode pattern and the second electrode pattern of the sub-pixel electrode is able to have different threshold voltages, and the phenomenon of yellow-bias and/or green-bias at a middle gray level and the phenomenon of yellow-bias at a high gray level can be suppressed, thereby mitigating the problem of color shift in a side view image of the pixel structures.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A pixel structure, electrically connected to a scan line and a data line, the pixel structure comprising:
   a control device;
   a main pixel electrode, electrically connected to the control device, wherein the main pixel electrode has a plurality of main pixel slits, and a width of the main pixel slits is S; and
   a sub-pixel electrode, electrically connected to the control device and being separated from the main pixel electrode, wherein the sub-pixel electrode comprises:
      a first electrode pattern, wherein the first electrode pattern has a plurality of first slits, and a width S1 of each of the first slits is equal to or greater than the width S of the main pixel slits; and
      a second electrode pattern, wherein the second electrode pattern has no slits or has a plurality of second slits, wherein a width S2 of each of the second slits is less than the width S of the main pixel slits, and wherein the first electrode pattern is connected to the second electrode pattern, and the first electrode pattern and the second electrode pattern have a same driving voltage.

2. The pixel structure of claim 1, the main pixel electrode and the sub-pixel electrode have different driving voltages.

3. The pixel structure of claim 2, further comprising a sharing switch device and a sharing capacitor electrically connected to the sharing switch device, wherein the sharing switch device is electrically connected to the control device.

4. The pixel structure of claim 1, wherein the second electrode pattern is located at a center of the sub-pixel electrode, and the first electrode pattern is located on two opposite sides of the second electrode pattern.

5. The pixel structure of claim 4, wherein a shape of the second electrode pattern comprises a quadrangle, and each side of the quadrangle and an extending direction of the scan line together have an included angle, wherein the included angle is between 45°~60°.

6. The pixel structure of claim 4, wherein a shape of the second electrode pattern comprises a quadrangle and has no slits, and at least one side of the quadrangle and an extending direction of a part of the first slits connected to the side of the quadrangle together have an included angle, wherein the included angle is between 80°18 100°.

7. The pixel structure of claim 1, wherein the first electrode pattern is located at a center of the sub-pixel electrode, and the second electrode pattern is located on two opposite sides of the first electrode pattern.

8. The pixel structure of claim 1, wherein the sub-pixel electrode further comprises a third electrode pattern, wherein the third electrode pattern has a plurality of third slits, and a width S3 of each of the third slits is less than the width S1 of the first slits.

9. The pixel structure of claim 8, wherein the width S3 of the third slits of the third electrode pattern of the sub-pixel electrode is less than the width S of the main pixel slits.

10. The pixel structure of claim 8, wherein the second electrode pattern is located at a center of the sub-pixel electrode, the first electrode pattern is located on two opposite sides of the second electrode pattern, and the third electrode is located on other two opposite sides of the second electrode pattern.

11. The pixel structure of claim 8, wherein the width S3 of the third slits of the third electrode pattern of the sub-pixel electrode is less than or equal to the width S of the main pixel slits, and the width S3 of the third slits of the third electrode pattern is greater than the width S2 of the second slits of the second electrode pattern.

12. A pixel array, comprising:
   a first pixel structure, comprising:
      a first control device;
      a first main pixel electrode, electrically connected to the first control device, wherein the first main pixel electrode has a plurality of first main pixel slits, and a width of the first main pixel slits is S; and
      a first sub-pixel electrode, electrically connected to the first control device and being separated from the first main pixel electrode, wherein the first sub-pixel electrode comprises:
         a first electrode pattern, wherein the first electrode pattern has a plurality of first slits, and a width S1 of each of the first slits is equal to or greater than the width S of the first main pixel slits; and
         a second electrode pattern, wherein the second electrode pattern has no slits or has a plurality of second slits, wherein a width S2 of each of the second slits is not equal to the width S1 of each of the first slits, and the width S2 of each of the second slits is less than or equal to the width S of the first main pixel slits; and
   a second pixel structure, comprising:
      a second control device;
      a second main pixel electrode, electrically connected to the second control device, wherein the second main pixel electrode has a plurality of second main pixel slits, and a width of each of the second main pixel slits is D1, wherein the width D1 of each of the second main pixel slits is equal to the width S of the first main pixel slits; and
      a second sub-pixel electrode, electrically connected to the second control device and being separated from the second main pixel electrode, wherein the second sub-pixel electrode has a plurality of second sub-pixel slits, and a width of each of the second sub-pixel slits is D2, wherein the width D2 of the second sub-pixel slits is equal to the width D1 of the second main pixel slits.

13. The pixel array of claim 12, wherein the width S1 of each of the first slits is greater than the width S of the first main pixel slits, and the second electrode pattern has no slits or has a plurality of second slits, wherein the width S2 of each of the second slits is less than or equal to the width S of the first main pixel slits.

14. The pixel array of claim 12, wherein the width S1 of each of the first slits is equal to the width S of the first main pixel slits, and the second electrode pattern has no slits or has a plurality of second slits, wherein the width S2 of each of the second slits is less than the width S of the first main pixel slits.

15. The pixel array of claim 12, wherein the first pixel structure is a blue pixel structure, and the second pixel structures is a red pixel structure or a green pixel structure.

16. The pixel array of claim 12, wherein the second electrode pattern is located at a center of the first sub-pixel electrode, and the first electrode pattern is located on two opposite sides of the second electrode pattern.

17. The pixel array of claim 16, wherein a shape of the second electrode pattern comprises a quadrangle, and each side of the quadrangle and an extending direction of the scan line together have an included angle, wherein the included angle is between 45°~60°.

18. The pixel array of claim 16, wherein a shape of the second electrode pattern comprises a quadrangle and has no slits, and at least one side of the quadrangle and an extending direction of a part of the first slits connected to the side of the quadrangle together have an included angle, wherein the included angle is between 80°~100°.

19. The pixel array of claim 12, wherein the first electrode pattern is located at a center of the first sub-pixel electrode, and the second electrode pattern is located on two opposite sides of the first electrode pattern.

20. The pixel array of claim 12, wherein the width S1 of each of the first slits is greater than the width S of the first main pixel slits, and wherein the first sub-pixel electrode further comprises a third electrode pattern, the third electrode pattern has a plurality of third slits, a width S3 of each of the third slits is less than or equal to the width S of the main pixel slits, and the width S3 of the third slits of the third electrode pattern is greater than the width S2 of the second slits of the second electrode pattern.

21. The pixel array of claim 12, further comprising:
a third pixel structure, comprising:
 a third control device;
 a third main pixel electrode, electrically connected to the third control device, wherein the third main pixel electrode has a plurality of third slits, and a width of each of the third main pixel slits is W1; and
 a third sub-pixel electrode, electrically connected to the third control device and being separated from the third main pixel electrode, wherein the third sub-pixel electrode comprises:
  a fourth electrode pattern, wherein the fourth electrode pattern has a plurality of fourth slits, and a width W3 of each of the fourth slits is equal to or greater than the width W1 of the third main pixel electrode; and
  a fifth electrode pattern, wherein the fifth electrode pattern has no slits or has a plurality of fifth slits, wherein a width W4 of each of the fifth slits is less than or equal to the width W1 of the third main pixel electrode.

* * * * *